(12) United States Patent
Takatsuka et al.

(10) Patent No.: US 12,177,342 B2
(45) Date of Patent: Dec. 24, 2024

(54) CIPHER KEY GENERATION APPARATUS AND CIPHER KEY GENERATION METHOD

(71) Applicant: Sony Group Corporation, Tokyo (JP)

(72) Inventors: Susumu Takatsuka, Tokyo (JP); Kenta Kawamoto, Tokyo (JP); Hiroki Tetsukawa, Kanagawa (JP)

(73) Assignee: Sony Group Corporation, Toyko (JP)

( * ) Notice: Subject to any disclaimer, the term of this patent is extended or adjusted under 35 U.S.C. 154(b) by 349 days.

(21) Appl. No.: 17/618,018

(22) PCT Filed: Jun. 9, 2020

(86) PCT No.: PCT/JP2020/022668
§ 371 (c)(1),
(2) Date: Dec. 10, 2021

(87) PCT Pub. No.: WO2020/255793
PCT Pub. Date: Dec. 24, 2020

(65) Prior Publication Data
US 2022/0271930 A1    Aug. 25, 2022

(30) Foreign Application Priority Data
Jun. 19, 2019  (JP) .................. 2019-113731

(51) Int. Cl.
*H04L 9/08* (2006.01)
*H04L 9/06* (2006.01)
(52) U.S. Cl.
CPC .......... *H04L 9/0869* (2013.01); *H04L 9/0662* (2013.01)

(58) Field of Classification Search
CPC ........................ H04L 9/0869; H04L 9/0662
See application file for complete search history.

(56) References Cited

U.S. PATENT DOCUMENTS 8,615,651 B1 * 12/2013 Modadugu ............ H04L 9/3228
 713/168
2006/0036864 A1   2/2006 Parulski
2019/0121955 A1 *  4/2019 Facon ................... G06F 21/45
2019/0190707 A1 *  6/2019 Tomita .................. G02F 1/035
(Continued)

FOREIGN PATENT DOCUMENTS

EP     3474485 A     4/2019
JP     2006-080658 A 3/2006
(Continued)

OTHER PUBLICATIONS

International Search Report (PCT/ISA/210), International Application No. PCT/JP2020/022668, dated Aug. 26, 2020.

*Primary Examiner* — Mohammed Waliullah
(74) *Attorney, Agent, or Firm* — Michael Best & Friedrich LLP

(57) ABSTRACT

To enhance tampering detection performance by rendering decipherment of a secret key for electronic signature difficult.
A cipher key generation apparatus according to the present technology includes a key generation section adapted to generate a secret key for electronic signature on the basis of a photoelectric random number which is a random number acquired on the basis of photoelectric conversion in an array sensor in which multiple pixels each having a visible or invisible light reception element are arranged one-dimensionally or two-dimensionally.

13 Claims, 31 Drawing Sheets

(56) References Cited

U.S. PATENT DOCUMENTS

2021/0028939 A1* 1/2021 Trevethan ............. H04L 9/0637
2021/0273795 A1* 9/2021 Dahlberg .............. H04L 9/0894

FOREIGN PATENT DOCUMENTS

| | | | |
|---|---|---|---|
| JP | 2009525711 A | * | 7/2009 |
| JP | 2017-157926 A | | 9/2017 |
| JP | 2017-184198 A | | 10/2017 |
| JP | 2019-020431 A | | 2/2019 |
| TW | 201035803 A | | 10/2010 |
| WO | WO-2019012779 A1 | | 1/2019 |
| WO | 2019/049662 A1 | | 3/2019 |

* cited by examiner

| V1 | V2 | V3 | V4 | V5 | V6 |
|---|---|---|---|---|---|
| V7 | V8 | V9 | V10 | V11 | V12 |
| V13 | V14 | V15 | V16 | V17 | V18 |
| V19 | V20 | V21 | V22 | V23 | V24 |
| V25 | V26 | V27 | V28 | V29 | V30 |
| V31 | V32 | V33 | V34 | V35 | V36 |

STILL IMAGE (SEED FRAME)

| V26 | V30 | V29 | V27 | V25 | V28 |
|---|---|---|---|---|---|
| V20 | V24 | V23 | V21 | V19 | V22 |
| V2 | V6 | V5 | V3 | V1 | V4 |
| V14 | V18 | V17 | V15 | V13 | V16 |
| V32 | V36 | V35 | V33 | V31 | V34 |
| V8 | V12 | V11 | V9 | V7 | V10 |

ENCRYPTION FILTER (CIPHER KEY)

FIG.15
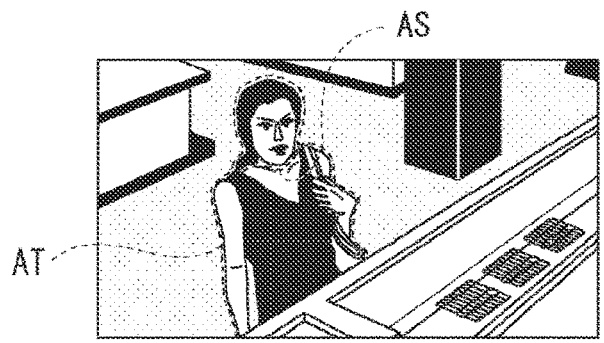
A
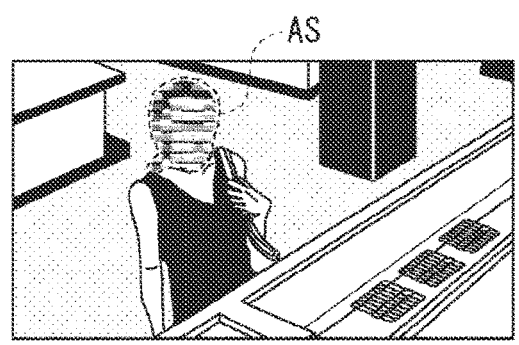
B
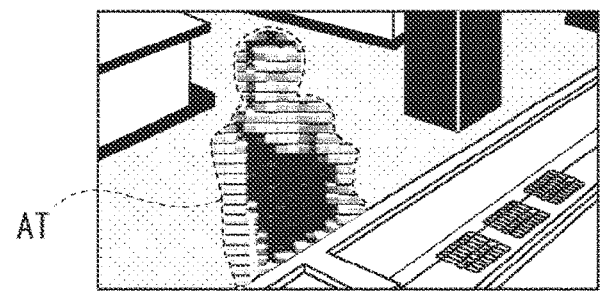
C
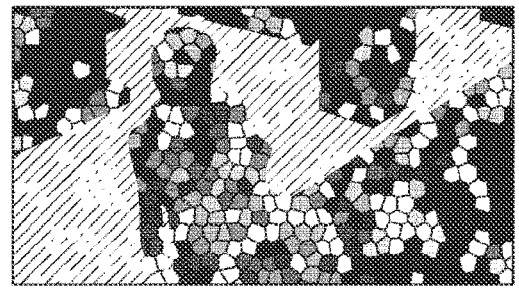
D

FIG.16
A
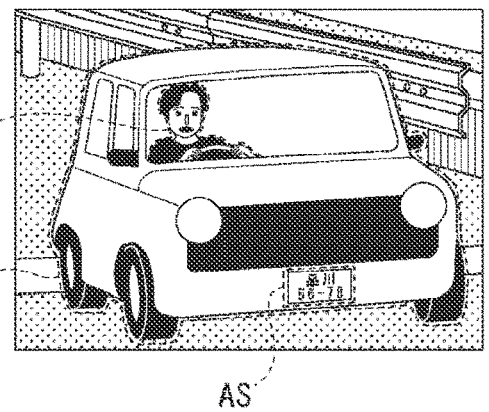
B
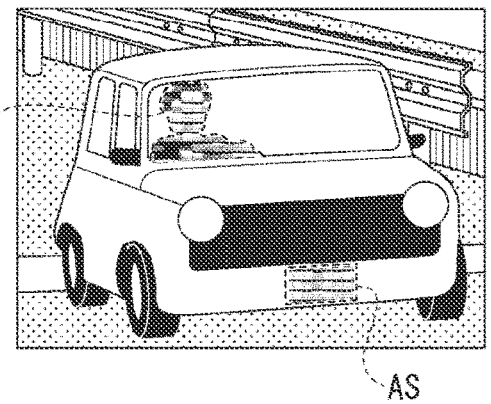
C
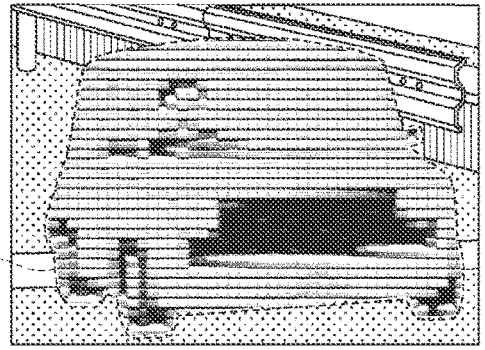
D
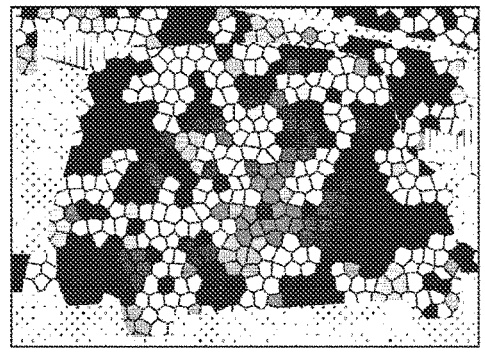

CIPHER KEY GENERATION APPARATUS AND CIPHER KEY GENERATION METHOD

TECHNICAL FIELD

The present technology relates to a cipher key generation apparatus and a cipher key generation method and particularly to technical fields associated with cipher key generation for electronic signature.

BACKGROUND ART

Electronic signature techniques are widely known for detecting data tampering. In the electronic signature techniques, a data transmitter generates a secret key used for encryption of a hash value and a public key. The transmitter transmits, to a receiver, data to be subjected to tampering detection, the hash value of the data encrypted with the secret key, and the public key. The receiver can not only calculate the hash value of the received data but also decrypt, with the received public key, the hash value encrypted with the secret key and determine whether or not the data has been tampered with, on the basis of whether or not these hash values match.

It should be noted that a technology that detects tampering of captured image data on the basis of electronic signature information is disclosed as related art in PTL 1 listed below.

CITATION LIST

Patent Literature

[PTL 1]
Japanese Patent Laid-Open No. 2017-184198

SUMMARY

Technical Problem

In the conventional electronic signature techniques, however, a secret key used to encrypt a hash value is generated on the basis of a pseudorandom number generated by software, and there has been a risk that the secret key could be deciphered and copied. If the secret key is copied, it is possible to cause the receiver to erroneously determine that tampered data is free from tampering. That is, an increased risk of decipherment of a secret key for electronic signature gives rise to decreased tampering detection performance.

The present technology has been devised in light of the foregoing, and it is an object of the present technology to enhance tampering detection performance by rendering decipherment of a secret key for electronic signature difficult.

Solution to Problem

A cipher key generation apparatus according to the present technology includes a key generation section that generates a secret key for electronic signature on the basis of a photoelectric random number as a random number acquired on the basis of photoelectric conversion in an array sensor in which multiple pixels each having a visible or invisible light reception element are arranged one-dimensionally or two-dimensionally.

This makes it possible to render decipherment of a secret key for electronic signature more difficult than that in the case where a pseudorandom number is used.

In the cipher key generation apparatus according to the present technology described above, it is conceivable that the key generation section generates a secret key for electronic signature for image data.

This makes it possible to render decipherment of a secret key for electronic signature more difficult than that in the case where a pseudorandom number is used, to deal with the case where data to be subjected to electronic signature is image data.

In the cipher key generation apparatus according to the present technology described above, it is conceivable that the key generation section generates a secret key for electronic signature for image data acquired through imaging by the array sensor.

As a result, an array sensor for acquiring image data is also used as an array sensor for acquiring a photoelectric random number.

In the cipher key generation apparatus according to the present technology described above, it is conceivable that an encryption section and a transmission processing section are included. The encryption section encrypts the image data acquired through imaging by the array sensor. The transmission processing section performs processing of transmitting the image data encrypted by the encryption section to an external apparatus.

This makes it possible to securely transmit image data as data to be subjected to electronic signature.

In the cipher key generation apparatus according to the present technology described above, it is conceivable that the encryption section encrypts the image data with a cipher key generated on the basis of the photoelectric random number.

This makes it possible, also for image data encryption, to render decipherment of a cipher key more difficult than that in the case where a pseudorandom number is used.

In the cipher key generation apparatus according to the present technology described above, it is conceivable that the encryption section encrypts the image data in such a manner that an image area capable of being decrypted varies depending on a level of a decipher key used to decrypt the image data, and it is also conceivable that, in response to a request from the external apparatus to transmit the image data encrypted by the encryption section, the transmission processing section decrypts the encrypted image data with a decipher key having the same level as the decipher key possessed by the external apparatus, generates a hash value of the decrypted image data, and transmits the hash value encrypted with the secret key and the encrypted image data to the external apparatus.

As a result, in the case where a hash value that is appropriate to the level of a decipher key possessed by a reception apparatus of image data should be transmitted to the reception apparatus, it is only necessary to generate a hash value when a transmission request is issued and on the basis of the level of the decipher key of the reception apparatus that has issued the transmission request, and it is no longer necessary to generate all hash values of the respective levels at once during recording of image data (captured image data).

In the cipher key generation apparatus according to the present technology described above, it is conceivable that the key generation section generates a secret key for electronic signature in a blockchain system on the basis of the photoelectric random number.

This makes it possible to render decipherment of a secret key for electronic signature in a blockchain system more difficult than that in the case where a pseudorandom number is used.

In the cipher key generation apparatus according to the present technology described above, it is conceivable that a verification operator selection section is included that selects a contract verification operator in a smart contract system on the basis of the photoelectric random number.

This makes it possible to render decipherment of a random number used to select a contract verification operator more difficult than the case where a pseudorandom number is used.

In the cipher key generation apparatus according to the present technology described above, it is conceivable that a representative selection section is included that selects a representative from among DApps service recipients on the basis of the photoelectric random number.

This makes it possible to render decipherment of a random number used to select a representative from among DApps service recipients more difficult than the case where a pseudorandom number is used.

In the cipher key generation apparatus according to the present technology described above, it is conceivable that the key generation section generates the secret key by acquiring, as the photoelectric random number, an electric signal value of each of the pixels that is acquired by the photoelectric conversion.

This makes it possible to generate a secret key for electronic signature that is difficult to decipher.

In the cipher key generation apparatus according to the present technology described above, it is conceivable that the key generation section generates the secret key on the basis of the photoelectric random number in a format in which at least some of electric signal values of the respective pixels are assigned to pixel positions different from pixel positions from which the electric signal values have been acquired.

This renders decipherment of a secret key for electronic signature more difficult than that in the case of using a photoelectric random number in a format in which the electric signal values of the respective pixels are assigned as is to the pixel positions from which these electric signal values have been acquired.

In the cipher key generation apparatus according to the present technology described above, it is conceivable that a deletion processing section is included that performs processing of deleting, after generation of the photoelectric random number, image data from which the photoelectric random number is derived, from a memory.

This makes it possible to prevent estimation of the photoelectric random number due to leakage of the image from which the photoelectric random number is derived.

In the cipher key generation apparatus according to the present technology described above, it is conceivable that a regeneration processing section is included that performs processing of regenerating the photoelectric random number in response to detection of unauthorized access from equipment external to the cipher key generation apparatus.

This makes it possible to update a secret key for electronic signature on the basis of the regenerated photoelectric random number in the case where unauthorized access from external equipment is detected.

A cipher key generation method according to the present technology is performed by an information processing apparatus. The cipher key generation method includes generating a secret key for electronic signature on the basis of a photoelectric random number as a random number acquired on the basis of photoelectric conversion in an array sensor in which multiple pixels each having a visible or invisible light reception element are arranged one-dimensionally or two-dimensionally.

Such a cipher key generation method also provides a similar advantageous effect to that of the cipher key generation apparatus according to the present technology described above.

BRIEF DESCRIPTION OF DRAWINGS

FIG. 15 illustrates diagrams regarding a conception of gradual image encryption in the case where a target class is a person.

FIG. 16 illustrates diagrams regarding a conception of gradual image encryption in the case where the target class is a vehicle.

DESCRIPTION OF EMBODIMENTS

Embodiments will be described below in the following order.
<1. First Embodiment>
[1-1. Configuration of electronic signature system]
[1-2. Configuration of imaging apparatus]
[1-3. Configuration of reception apparatus]
[1-4. Random number used for encryption]
[1-5. Signal to be encrypted]
[1-6. Tamper proofing]
[1-7. Processing procedure for image encryption]
[1-8. Passing of key for image decryption]
[1-9. Tampering detection technique as first embodiment]
<2. Second Embodiment>
[2-1. Image encryption technique of second embodiment]
[2-2. Processing procedure for image encryption]
[2-3. Tampering detection technique as second embodiment]
[2-4. Confirmation process of public key possessed by receiver side]
[2-5. Confirmation process of electronic signature public key possessed by transmitter side]
<3. Third Embodiment>
<4. Modification example>
<5. Conclusion of embodiments>
<6. Present technology>

1. First Embodiment

[1-1. Configuration of Electronic Signature System]

Figure 1:
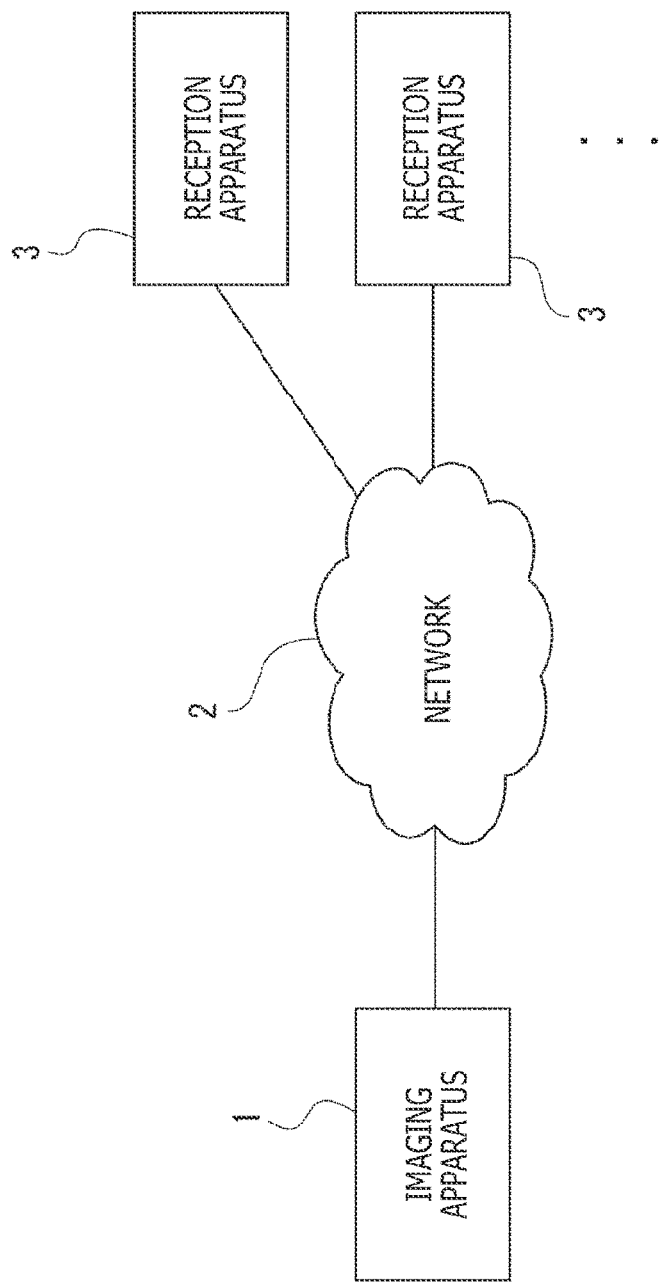
FIG. 1 is a block diagram illustrating a schematic configuration example of an electronic signature system as a first embodiment.

FIG. 1 is a block diagram illustrating a schematic configuration example of an electronic signature system in a first embodiment.

As illustrated, the electronic signature system includes an imaging apparatus 1, a network 2, and multiple reception apparatuses 3.

The imaging apparatus 1 is an embodiment of a cipher key generation apparatus according to the present technology and acquires image data (captured image data) as digital data by capturing an image with an image sensor. In the present embodiment, data to be subjected to electronic signature is image data acquired by the imaging apparatus 1.

Each of the reception apparatuses 3 is an apparatus that receives data to be subjected to electronic signature, i.e., image data acquired by the imaging apparatus 1 in the present example, and is configured to perform data communication with the imaging apparatus 1 via the network 2 which is, for example, the Internet.

As will be described later, when transmitting captured image data to the reception apparatus 3, the imaging apparatus 1 not only generates a secret key for electronic signature and a public key based on the secret key but also calculates a hash value for the captured image data to be transmitted and encrypts the hash value with the secret key. Then, the imaging apparatus 1 transmits the encrypted hash value, the captured image data to be transmitted, and the public key to the reception apparatus 3.

The reception apparatus 3 performs tampering detection processing on the received captured image data on the basis of these pieces of data transmitted from the imaging apparatus 1.

It should be noted that the processing of detecting tampering in the present embodiment will be described later.

In the present embodiment, when transmitting captured image data to the reception apparatus 3, the imaging apparatus 1 encrypts the captured image data to enhance confidentiality. As will be described later, the imaging apparatus 1 of the present embodiment performs various types of processing to encrypt captured image data in such a manner.

[1-2. Configuration of Imaging Apparatus]

Figure 2:
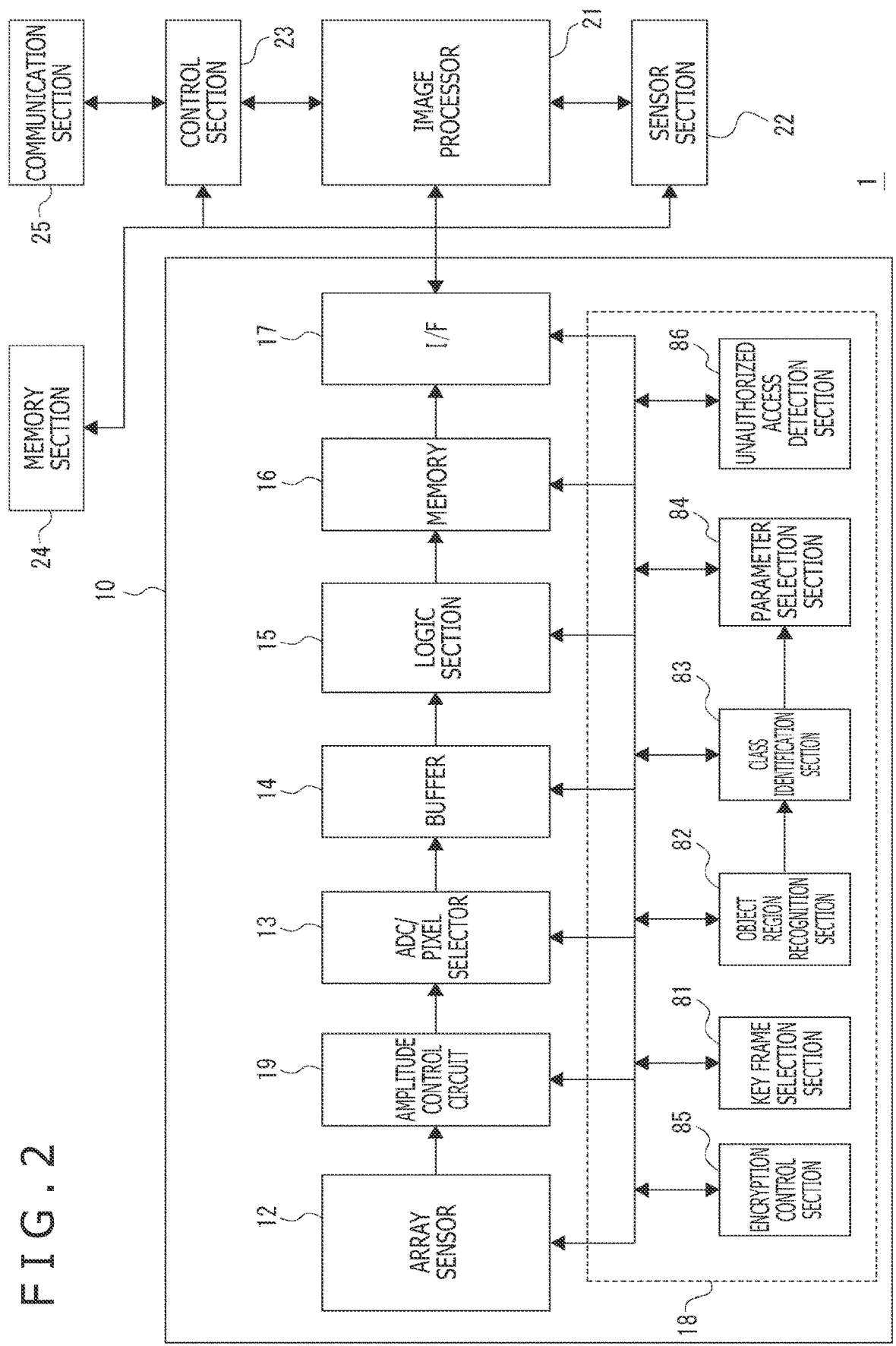
FIG. 2 is a block diagram illustrating an internal configuration example of a cipher key generation apparatus (imaging apparatus) as the first embodiment.

FIG. 2 is a block diagram illustrating an internal configuration example of the imaging apparatus 1.

The imaging apparatus 1 includes an imaging sensor section 10, an image processor 21, a sensor section 22, a control section 23, a memory section 24, and a communication section 25.

The imaging sensor section 10 acquires captured image data by receiving, for each pixel, incident light entering the imaging sensor section 10 via unillustrated camera optics that is provided in the imaging apparatus 1, and by converting the light into electricity.

Although not illustrated here, the imaging sensor section 10 has, as hardware, components including an image sensor device, a memory device such as a DRAM (Dynamic Random Access Memory), and an AI (artificial intelligence) function processor. Then, an integrated device is formed, for example, by stacking these three components one on top of another, arranging them flat in one layer, or stacking them in two layers (e.g., arranging the memory device and the AI function processor in the same layer).

The imaging sensor section 10 of the present example has an object detection function using image analysis, and the imaging sensor section 10 can thus be referred to as an intelligent array sensor.

As illustrated, the imaging sensor section 10 includes an array sensor 12, an amplitude control circuit 19, an ADC (Analog to Digital Converter)/pixel selector 13, a buffer 14, a logic section 15, a memory 16, an interface section 17, and a computation section 18.

The array sensor 12 includes multiple pixels each having a visible or invisible light reception element. The multiple pixels are arranged one-dimensionally or two-dimensionally. For example, a number of pixels are arranged two-dimensionally in row and column directions, and a two-dimensional image signal is output through photoelectric conversion in the light reception element of each pixel.

The amplitude control circuit 19 controls the amplitude of an electric signal (analog signal) photoelectrically converted by the array sensor 12. In the present example, the amplitude control circuit 19 can change an amplification factor on the basis of an instruction from the computation section 18, and details thereof will be described later.

The electric signal photoelectrically converted by the array sensor 12 is input to the ADC/pixel selector 13 via the amplitude control circuit 19. The ADC/pixel selector 13 converts the received electric signal as an analog signal into digital data and outputs an image signal (image data) as digital data.

Also, the ADC/pixel selector 13 has a function to select pixels (light reception elements) of the array sensor 12. This makes it possible to acquire photoelectric conversion signals of only the selected pixels of the array sensor 12, convert these signals into digital data, and output the digital data. That is, although normally converting the photoelectric conversion signals of all the effective pixels included in one frame image into digital data and outputting the digital data, the ADC/pixel selector 13 can also convert the photoelectric conversion signals of only the selected pixels into digital data and output the digital data.

Although image data is acquired by the ADC/pixel selector 13 frame by frame, each of these pieces of frame image data is temporarily stored in the buffer 14, read at an adequate timing, and supplied to the logic section 15 for processing.

The logic section 15 performs various types of necessary signal processing (image processing) on each frame image signal received as input.

For example, it is presumed that the logic section 15 adjusts an image quality through processing such as color correction, gamma correction, color gradation processing, gain processing, and edge enhancement. It is also presumed that the logic section 15 performs processing of changing the data size, such as data compression processing, resolution conversion, and frame rate conversion.

A parameter used for each processing task is set to each of these processing tasks performed by the logic section 15. Examples of setting values include color and luminance correction coefficients, gain values, compression ratios, and frame rates. The logic section 15 performs necessary processing by using the parameter set for each processing task. In the present embodiment, there are cases where the computation section 18 sets these parameters.

Image data processed by the logic section 15 is stored in the memory 16 that includes, for example, a DRAM and the like.

The image data stored in the memory 16 is transmitted and output to the image processor 21 and the like at a necessary timing by the interface section 17.

The image processor 21 detects a necessary object or the like by performing image analysis and image recognition processing on the image data transmitted from the imaging sensor section 10.

The image processor 21 can also refer to detection information of the sensor section 22.

Also, in the imaging sensor section 10, the computation section 18 is configured, for example, as a single AI processor. Then, the computation section 18 includes, as illustrated, a key frame selection section 81, an object region recognition section 82, a class identification section 83, a parameter selection section 84, an encryption control section 85, and an unauthorized access detection section 86 as executable computation functions. It should be noted that multiple processors may be included in these computation functions.

The key frame selection section 81 performs processing of selecting a key frame from among image data frames as videos according to a predetermined algorithm or instruction.

The object region recognition section 82 performs, for an image data frame acquired by the ADC/pixel selector 13 after photoelectric conversion in the array sensor 12, processing of detecting an object region which is a potential region to be detected and processing of recognizing, for an object to be detected, a region (bounding box) surrounding the object inside the image (frame).

The object to be detected from an image signal refers to an object that can be an object to be detected for the purpose of recognition from an image. Although the kind of object used as an object to be detected varies depending on the purpose of detection, processing capability, application category, and the like of the imaging sensor section 10 or the image processor 21, there is a possibility that any object may be used as the abovementioned object to be detected. Just to name only some of such objects, any objects such as animals, moving objects (e.g., automobiles, bicycles, aircraft), natural objects (e.g., vegetables, plants), industrial products/components, structures, facilities, mountains, seas, rivers, stars, sun, and clouds may possibly fall under this category.

Also, the object region recognition section 82 of the present example performs processing of calculating, on the basis of the bounding box, an ROI (Region of Interest) which is region information indicating a region to be processed (region of interest).

The class identification section 83 classifies objects detected by the object region recognition section 82.

The classes are information representing object categories, and the objects to be detected are classified, for example, into "person," "automobile," "aircraft," "ship," "truck," "bird," "cat," "dog," "deer," "frog," "horse," and the like.

The parameter selection section 84 stores signal processing parameters each corresponding to a class and selects corresponding one or more parameters by using the class, bounding box, and the like of the detected object identified by the class identification section 83. Then, the corresponding one or more parameters are set to the logic section 15.

Here, processing for various functions of the computation section 18 described above is not normally performed within the image sensor. In the present embodiment, however, the object detection, the class recognition, and the control based thereon are performed within the image sensor. This makes it possible to adequately tailor image data to be supplied to the image processor 21, to fit the purpose of detection, and adequately reduce the amount of data so as to prevent degradation of detection performance.

The encryption control section 85 performs control in such a manner that the image signal acquired through imaging by the array sensor 12 is encrypted. It should be noted that a specific example of processing performed by the encryption control section 85 for encryption of such an image signal will be described later.

The unauthorized access detection section 86 detects unauthorized access from equipment external to the imaging apparatus 1. Specifically, the unauthorized access detection section 86 of the present example detects unauthorized access from external equipment to data stored in the memory 16.

In the case where unauthorized access is detected, the unauthorized access detection section 86 records log information thereof (e.g., information indicating detection date and time and access type) in a predetermined region of the memory 16.

The control section 23 includes, for example, a microcomputer that includes a CPU (Central Processing Unit), a ROM (Read Only Memory), and a RAM (Random Access Memory). The CPU performs various types of processing according to a program stored in the ROM or loaded into the RAM (Random Access Memory), and the imaging apparatus 1 is thus controlled as a whole.

For example, the control section 23 issues instructions to the imaging sensor section 10 to control execution of various types of processing such as processing of acquiring captured image data. Similarly, the control section 23 controls execution of various types of processing of the image processor 21.

Also, the control section 23 controls writing and reading of various types of data to and from the memory section 24. The memory section 24 is, for example, a non-volatile storage device such as HDD (Hard Disk Drive) or flash memory device and is used, for example, to store (record) various types of data such as captured image data acquired from the imaging sensor section 10.

Further, the control section 23 performs various types of data communication with an external apparatus via the communication section 25. The communication section 25 is configured to perform data communication with the external apparatus via the network 2 illustrated in FIG. 1.

The control section 23 can transmit, in response to a request from the reception apparatus 3 illustrated in FIG. 1, various types of data such as captured image data acquired by the imaging sensor section 10 and stored in the memory section 24, to the reception apparatus 3 via the communication section 25.

Here, the control section 23 performs various types of processing associated with electronic signature, and such processing will be described later.

[1-3. Configuration of Reception Apparatus]

Figure 3:
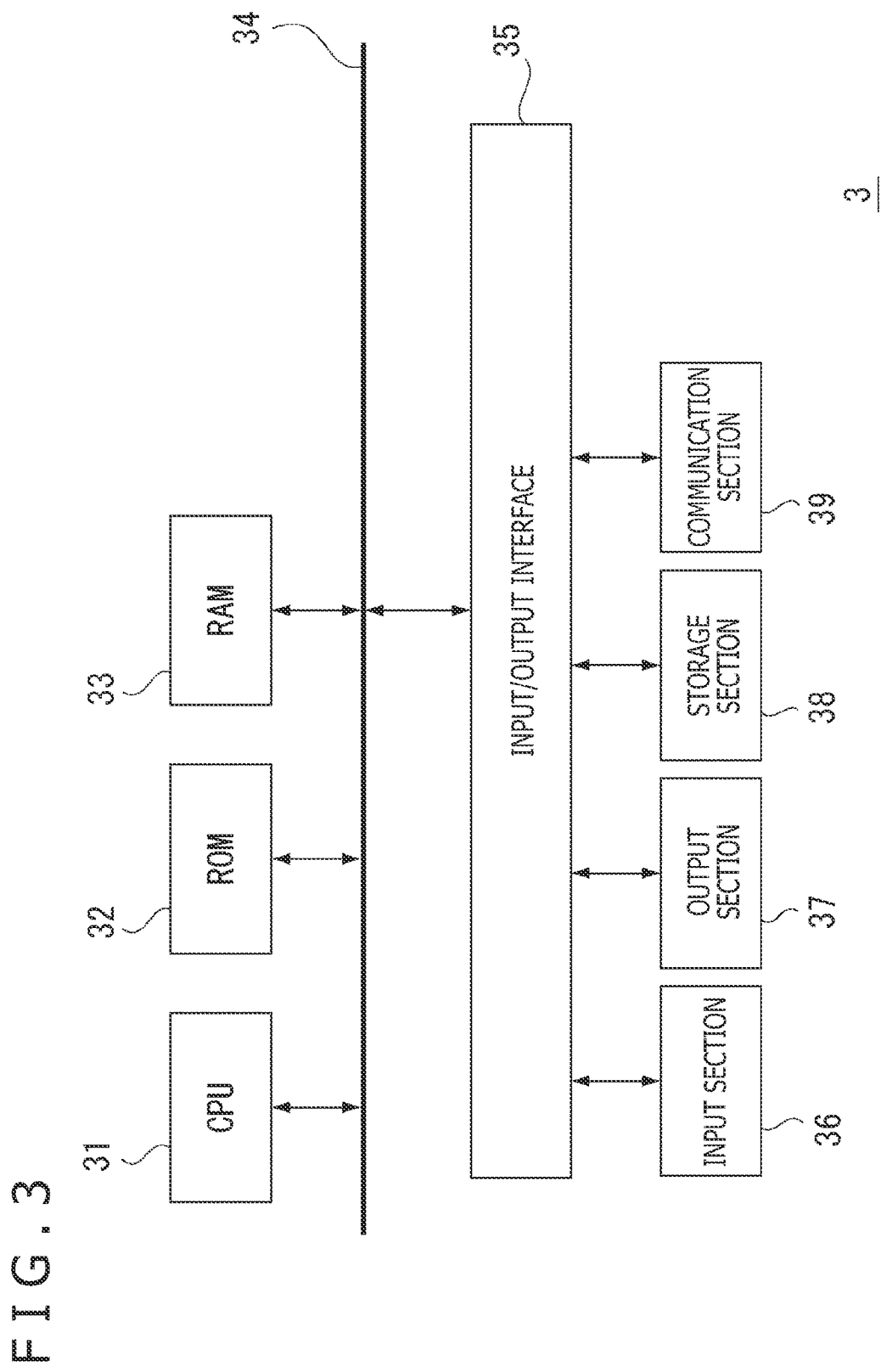
FIG. 3 is a block diagram illustrating an internal configuration example of a reception apparatus in the first embodiment.

FIG. 3 is a block diagram illustrating an internal configuration example of the reception apparatus 3.

As illustrated, the reception apparatus 3 includes a CPU 31, a ROM 32, a RAM 33, a bus 34, an input/output interface 35, an input section 36, an output section 37, a storage section 38, and a communication section 39.

The CPU 31, the ROM 32, and the RAM 33 are connected to each other via the bus 34. The input/output interface 35 is also connected to the bus 34. The CPU 31 performs various types of processing according to a program stored in the ROM 32 or loaded into the RAM 33 from the storage section 38. Data and the like required for the CPU 31 to perform various types of processing are also stored in the RAM 33 as appropriate.

The input section 36, the output section 37, the storage section 38, and the communication section 39 are connected to the input/output interface 35.

The input section 36 comprehensively represents, for example, manipulation input detection devices such as a keyboard, a mouse, and a touch panel that detect manipulation input information from a user.

The output section 37 includes, for example, a display that includes an LCD (Liquid Crystal Display), an organic EL (Electroluminescence) panel, or the like, a speaker, and the like.

The storage section 38 includes an HDD (Hard Disk Drive), a flash memory device, and the like.

The communication section 39 performs communication processing and communication between devices via the network 2.

In the reception apparatus 3, the CPU 31 performs decryption of encrypted captured image data transmitted from the imaging apparatus 1, processing of detecting tampering of captured image data based on electronic signature data, and the like, and specific examples thereof will be described later.

[1-4. Random Number Used for Encryption]

Here, the imaging apparatus 1 of the present embodiment encrypts captured image data which is data to be subjected to electronic signature, and a photoelectric random number is used to encrypt such captured image data in the present example. That is, a cipher key used to encrypt captured image data is generated on the basis of a photoelectric random number.

Here, the photoelectric random number refers to a random number acquired on the basis of photoelectric conversion in the array sensor 12. Specifically, in the present example, a cipher key is generated by acquiring, as a photoelectric random number, an electric signal value of each pixel obtained from photoelectric conversion in the array sensor 12.

Figure 4:
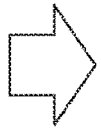
FIG. 4 is a diagram illustrating an example of a technique for generating an encryption filter (cipher key) on the basis of a photoelectric random number.

FIG. 4 is a diagram illustrating an example of a technique for generating an encryption filter (cipher key) for image data on the basis of a photoelectric random number.

First, an electric signal value of each pixel acquired by photoelectric conversion in the array sensor 12 is illustrated on the left in FIG. 4. In the present example, each pixel value (luminance value) of an image (still image) captured by the array sensor 12 is used as a photoelectric random number.

Here, a frame image captured to acquire a photoelectric random number, that is, a frame image from which the photoelectric random number is derived, will be denoted as a "seed frame."

In the present example, such an electric signal value of each pixel is not used as is as a photoelectric random number. Instead, as illustrated on the right in FIG. 4, a photoelectric random number is generated in a format in which at least some of electric signal values of the respective pixels are assigned to pixel positions different from those from which the electric signal values have been acquired. In other words, a photoelectric random number is generated by shuffling the pixel positions for the electric signal values of the respective pixels. Then, in the present example, the photoelectric random number generated in such a manner is used as a cipher key (encryption filter) for captured image data.

By using the photoelectric random number in the format in which the pixel positions are shuffled as described above, it is possible to render decipherment of a cipher key more difficult than that in the case where pseudorandom numbers are used that are generated by assigning electric signal values of the respective pixels as is to the pixel positions from which these electric signal values have been acquired, thus enhancing security.

Here, it is also possible to modulate an electric signal value of each pixel with a predetermined algorithm and use the modulated value to generate a cipher key. For example, there is used a photoelectric random number in a format in which values acquired by multiplying the electric signal values of the respective pixels by a predetermined coefficient are assigned to the pixels. Alternatively, in the case where the electric signal values of the respective pixels include a fractional portion, a possible technique would be to transform several decimal places into an integer and use the resulting value as a photoelectric random number.

It should be noted that it is not mandatory to shuffle the pixel positions for generating a cipher key as described above, and the electric signal values of the respective pixels can be used as is as a cipher key.

Here, pseudorandom numbers generated by software have been frequently used as random numbers for encryption. However, pseudorandom numbers are generated by an algorithm that calculates values, and true random numbers cannot be generated. Accordingly, there has been a risk that a cipher key could be deciphered and copied.

In contrast, the photoelectric random number described above can be a true random number, and it is possible to render decipherment of a secret key difficult by generating a cipher key on the basis of a photoelectric random number.

[1-5. Signal to be Encrypted]

In the case where an image signal acquired through imaging by the array sensor 12 is encrypted, it has been common to temporarily store an image signal read from the array sensor 12 in a memory in a clear text form and encrypt the stored image signal.

However, in the case where such an encryption technique is employed, such hacking becomes possible that an error is intentionally caused during encryption by using malware or the like, memory contents are then output in a dump file, and the clear text in the memory is thus copied.

Accordingly, in the present embodiment, the signals read from the pixels of the array sensor 12 are encrypted, thus preventing image signals in a clear text form from being stored in the memory.

Specifically, in the present example, the amplitude control circuit 19 illustrated in FIG. 2 controls the amplitudes of the signals read from the pixels of the array sensor 12, with a coefficient appropriate to the cipher key (encryption filter) illustrated in FIG. 4, thus realizing encryption of the read signals.

Figure 5:
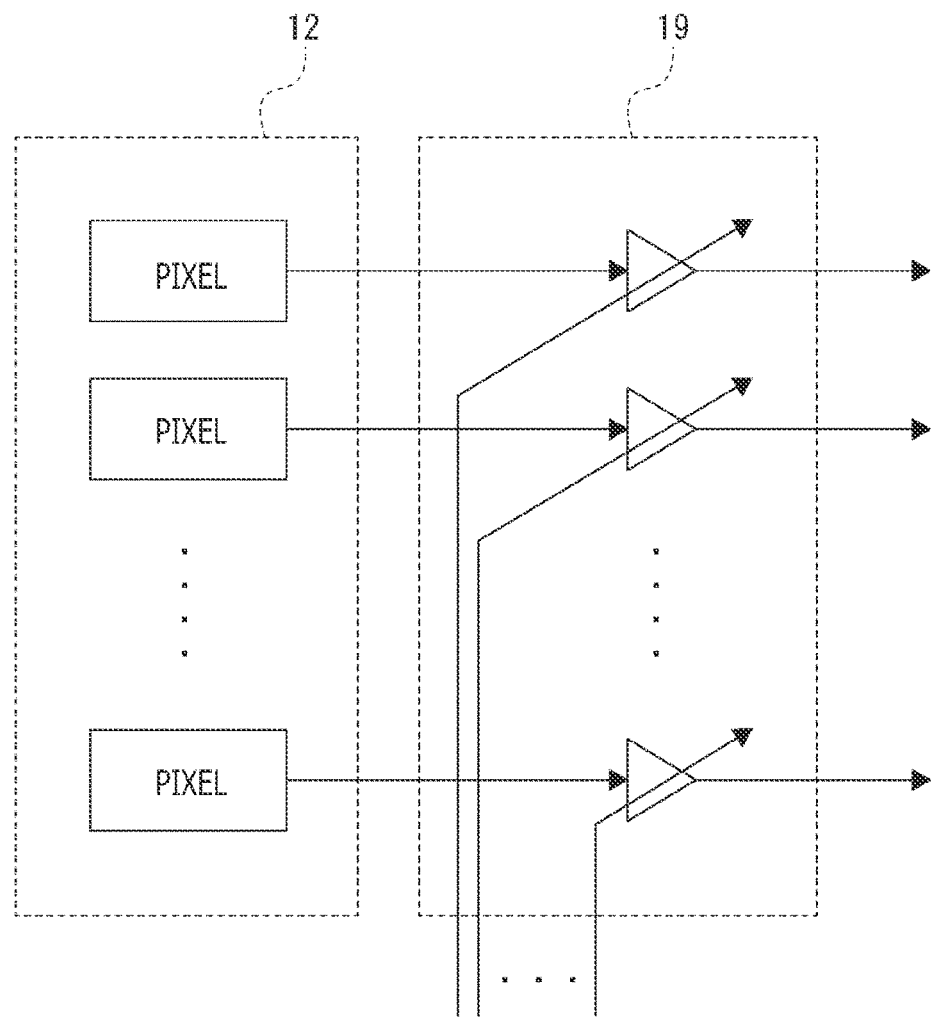
FIG. 5 is a diagram illustrating a conception of encryption of a signal read by an amplitude control circuit in the embodiment.

FIG. 5 is a diagram illustrating a conception of encryption of a signal read by the amplitude control circuit 19.

As illustrated, the signals (charge signals in this case) read from the respective pixels of the array sensor 12 are multiplied by a coefficient appropriate to a cipher key by amplifiers included in the amplitude control circuit 19. In the imaging apparatus 1 illustrated in FIG. 2, the signals read from the respective pixels undergo amplitude control in analog form in such a manner, are converted from analog to digital form by the ADC/pixel selector 13, and are stored (recorded) in the memory 16 via the buffer 14 and the logic section 15.

The encryption control section 85 sets a coefficient appropriate to the cipher key to the amplifier, thus allowing the signals read from the respective pixels of the array sensor 12 to be encrypted.

It should be noted that FIG. 5 is merely a conception diagram, and it is not mandatory for the amplitude control circuit 19 to have an amplifier for each pixel. For example, in the case where all the pixels are read at once as in a CCD (Charge-coupled devices) image sensor, the amplitude control circuit 19 may possibly include a common amplifier that is shared by all the pixels. It should be noted that, in this case, amplitude control for each pixel is performed in a time-divided manner.

As described above, the example in which an analog read signal is encrypted has been cited as an example of encryption of a read signal. It is also possible to encrypt a digital read signal acquired by conversion from analog to digital form.

Figure 6:
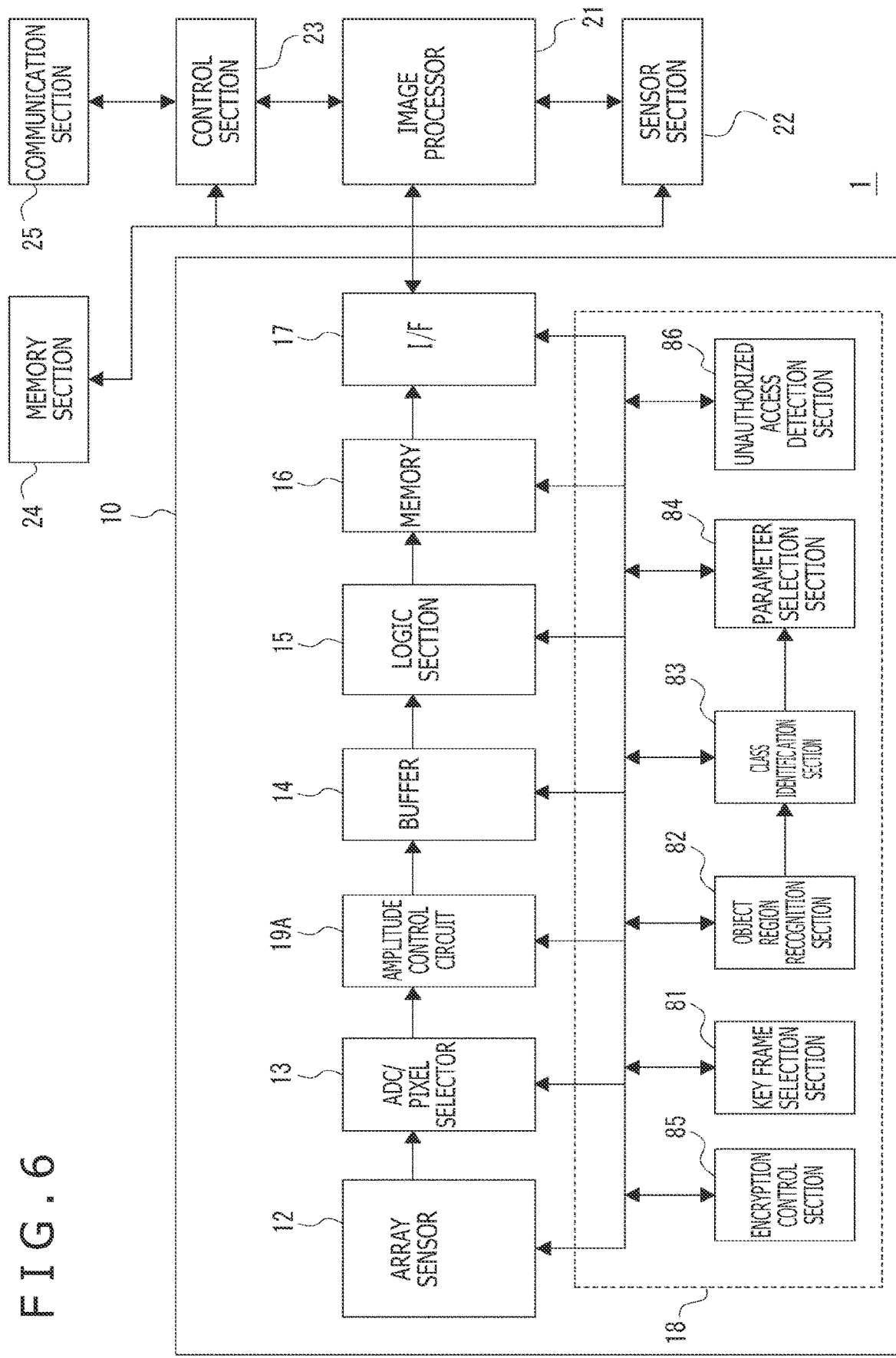
FIG. 6 is a diagram illustrating a configuration example of the imaging apparatus in the case where a digital read signal is encrypted.

FIG. 6 is a diagram illustrating a configuration example of the imaging apparatus 1 in the case where a digital read signal is encrypted.

In the imaging apparatus 1 in this case, in place of the amplitude control circuit 19, an amplitude control circuit 19A is provided to control the amplitude of a read signal that has been converted into a digital signal by the ADC/pixel selector 13.

It should be noted that processing performed by the encryption control section 85 in this case is similar to the abovementioned processing except that the coefficient appropriate to the cipher key for each pixel is set to the amplitude control circuit 19A instead of the amplitude control circuit 19. Accordingly, redundant description is omitted.

Here, when an analog read signal is encrypted as described above, since it is extremely difficult to acquire an analog signal from external equipment in an unauthorized manner, security is enhanced.

It should be noted that, in the case where an analog read signal is encrypted, there is a concern that an image acquired by decrypting the encrypted image may have lower image reproducibility.

However, for example, in the case where the image to be encrypted is used to analyze an attribute or behavior of a target such as person, the image reproducibility need only permit detection or analysis of a target, and it is conceivable that there are no practical problems.

Meanwhile, in the case where a digital read signal is encrypted, it is possible to improve accuracy of encryption processing and image reproducibility.

Here, the encryption of a read signal as described above is a type of encryption by a stream cipher scheme. The stream cipher scheme is a cipher scheme that encrypts clear text in predetermined data units such as on a bit-by-bit basis or a byte-by-byte basis.

In the stream cipher scheme, there is no need to make the data length uniform for the signal to be encrypted, thus making preprocessing of encryption on the signal to be encrypted unnecessary. Accordingly, it is possible to speed up encryption processing by adopting the stream cipher scheme.

Here, even in the case where an analog read signal is encrypted, there is no change in the fact that encrypted captured image data is acquired as a result as data to be subjected to electronic signature. From this perspective, the encryption of a signal in analog form is construed as falling within the bounds of image data encryption in the present specification.

[1-6. Tamper Proofing]

Figure 7:
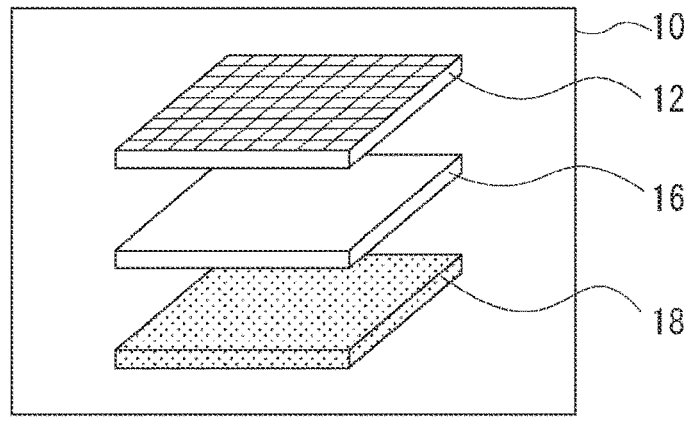
FIG. 7 is a diagram illustrating an example of a structure of an imaging sensor section as the embodiment.

In the imaging sensor section 10 of the present example, respective chips of the array sensor 12, the memory 16, and the computation section 18 are integrated into a single package as illustrated in FIG. 7 to ensure tamper proofing of hardware. In the example illustrated in FIG. 7, the chip as the memory 16 is stacked on top of the chip as the computation section 18, and the chip as the array sensor 12 is stacked on top of the chip as the memory 16.

In the present example, the encryption section that encrypts a read signal is formed, for example, inside the chip as the array sensor 12.

Also, the encryption control section 85 that generates a cipher key based on a photoelectric random number and causes the encryption section described above to perform encryption on the basis of the cipher key is included in the chip as the computation section 18.

In the present example, the chips are electrically connected to each other by Cu—Cu connection for connecting Cu (copper) pads, and an attempt to disassemble the imaging sensor section 10 results in damaging these electrically connected portions. That is, this ensures tamper proofing of hardware.

Figure 8:
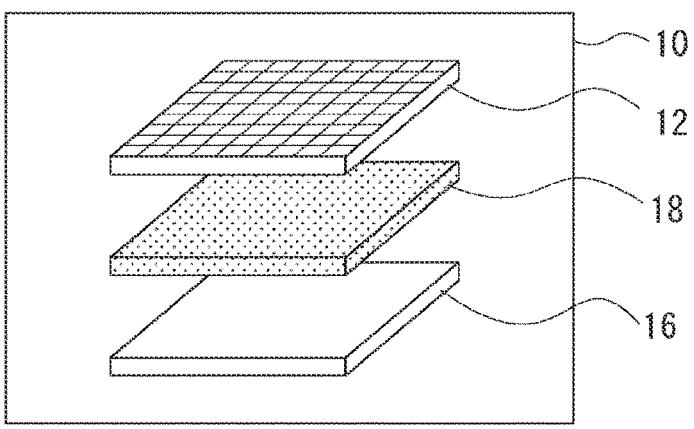
FIG. 8 is a diagram illustrating another example of the structure of the imaging sensor section as the embodiment.

FIG. 8 is a diagram illustrating another example of the structure of the imaging sensor section 10 and differs from FIG. 7 in that a vertical positional relation between the computation section 18 and the memory 16 has been swapped.

Figure 9:
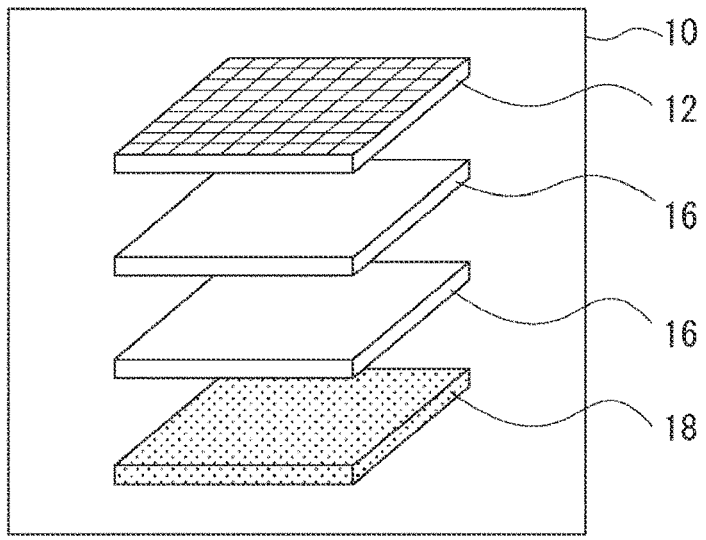
FIG. 9 is a diagram illustrating still another example of the structure of the imaging sensor section as the embodiment.

FIG. 9 is a diagram illustrating still another example of the structure of the imaging sensor section 10 and differs from FIG. 7 in that the multiple chips (two in the example illustrated) as the memory 16 are stacked.

It should be noted that, although not illustrated, the imaging sensor section 10 can also have a two-layer structure in which the memory 16 and the computation section 18 are formed in the same layer, or have a one-layer structure in which the array sensor 12, the memory 16, and the computation section 18 are formed in the same layer.

By adopting a single package configuration as illustrated in FIGS. 7 to 9, it is possible to take measures for enhancing resistance to unauthorized information acquisition from the memory 16 by disassembly, such as the Cu—Cu connection described above, thus ensuring tamper proofing of hardware.

[1-7. Processing Procedure for Image Encryption]

Next, a description of a processing procedure performed by the computation section 18 to realize the image encryption as the first embodiment described above will be given with reference to the flowchart in FIG. 10.

It should be noted that at least some of the processing tasks described below can also be realized as processing by hardware.

Figure 10:
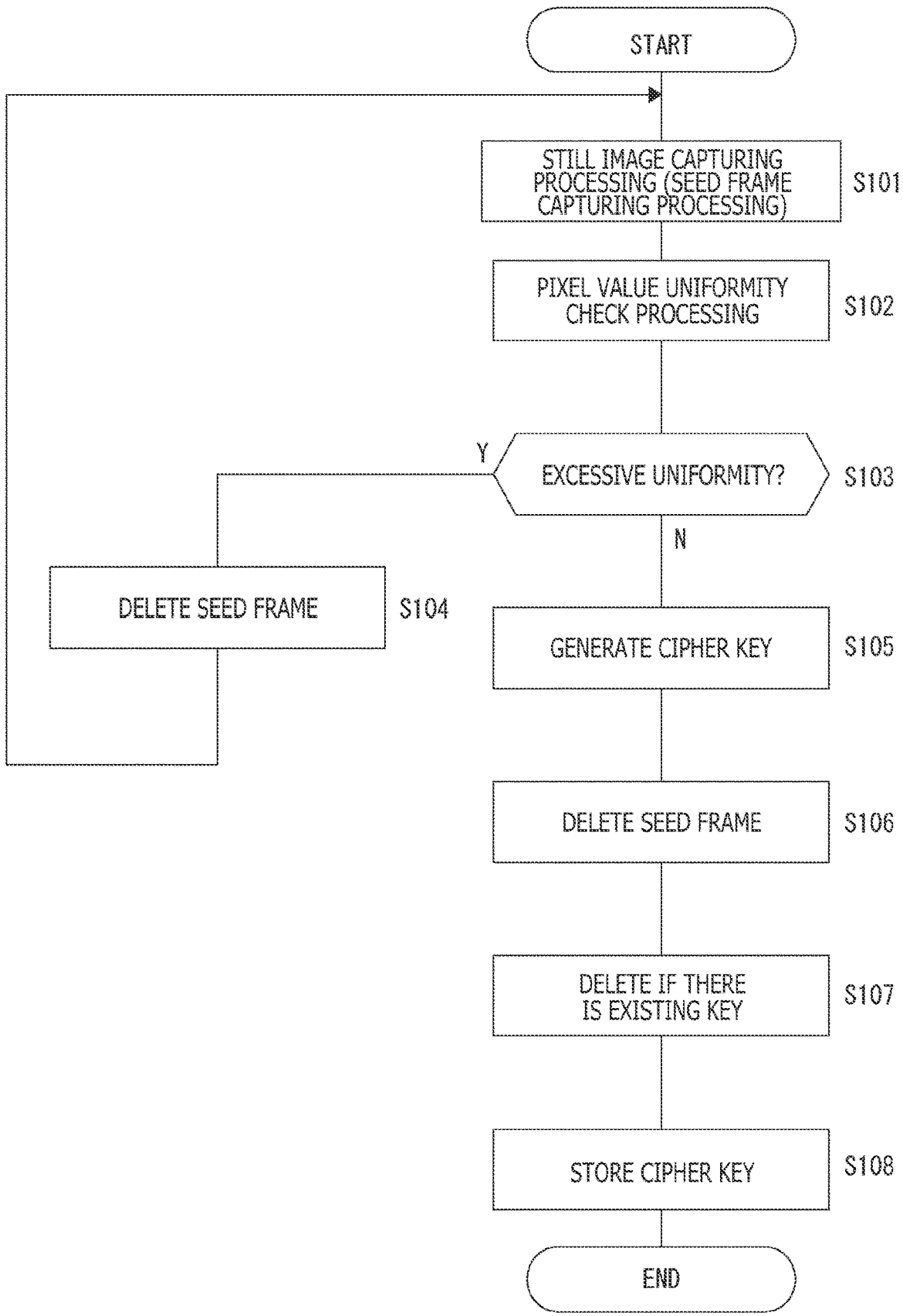
FIG. 10 is a flowchart illustrating a processing procedure to be performed in order to realize image encryption as the first embodiment.

First, as a precondition, the computation section 18 of the present example starts the processing illustrated in FIG. 10 at the time of startup and in response to detection of unauthorized access by the unauthorized access detection section 86.

As the processing illustrated in FIG. 10 is started in response to detection of unauthorized access, the acquisition of a photoelectric random number (S101) and the generation of a cipher key (S105) are performed in response to detection of unauthorized access. That is, a photoelectric random number is acquired again in response to detection of unauthorized access, and a cipher key is regenerated on the basis of the photoelectric random number that has been acquired again. This ensures tamper proofing of software.

It should be noted that the processing illustrated in FIG. 10 can also be started on the basis of another condition such as starting of the processing in response to an external instruction (e.g., instruction appropriate to manipulation input) or starting of the processing at regular time intervals.

In FIG. 10, the computation section 18 performs still image capturing processing in step S101. The still image capturing processing is performed to capture a still image from which a cipher key will be generated, and the computation section 18 controls the array sensor 12 to capture one frame's worth of image (read the charge for each pixel).

As a result of the still image capturing processing in step S101, image data as a seed frame is stored in the memory 16.

The computation section 18 performs pixel value uniformity check processing in step S102 following step S101. The pixel value uniformity check processing is processing of checking uniformity of a luminance value for each pixel for the seed frame, and specifically, the computation section 18 counts the number of pixels whose luminance values are zero or saturated (maximum).

It should be noted that the pixel value uniformity check processing can be performed as processing of checking the uniformity of the read signal values.

In step S103 following step S102, the computation section 18 determines whether or not the uniformity is excessive. Specifically, the computation section 18 determines whether or not the number of pixels counted in step S102 is equal to or greater than a predetermined threshold (e.g., value corresponding to value ranging from 30% to 50% of the number of effective pixels). In the case where it is determined that the uniformity is excessive because the number of pixels counted in step S102 is equal to or greater than the threshold described above, the computation section 18 proceeds to step S104, performs processing of deleting the seed frame, i.e., processing of deleting the image data as the seed frame stored in the memory 16, and then returns to step S101.

This makes it possible to capture a seed frame again to deal with the case where randomness of the seed frame pixel values is poor. That is, it is possible to acquire a photoelectric random number again to deal with the case where the randomness of a photoelectric random number is poor.

Accordingly, it is possible to prevent encryption with a cipher key based on random numbers whose randomness is poor, thus enhancing security.

On the other hand, in the case where it is determined in step S103 that the uniformity is not excessive because the number of pixels counted in step S102 is not equal to or greater than the threshold described above, the computation section 18 proceeds to step S105 and generates a cipher key. Specifically, in the present example, a cipher key is generated that indicates a coefficient to be set to each amplifier in the amplitude control circuit 19 (or 19A) on the basis of the luminance value of each pixel in the seed frame.

Here, in the present example, a cipher key is not generated in the processing in step S105 on the basis of a photoelectric random number in a format in which the luminance values of the respective pixels are assigned as is to the pixel positions from which the luminance values have been acquired. Instead, a cipher key is generated on the basis of a photoelectric random number in a format in which at least some of the luminance values of the respective pixels are assigned to the pixel positions different from those from which the luminance values have been acquired.

This renders decipherment of a cipher key difficult, thus enhancing security.

In step S106 following step S105, the computation section 18 performs processing of deleting the seed frame, i.e., processing of deleting the image data as the seed frame stored in the memory 16 by the image capturing processing in step S101.

By performing the seed frame deletion processing, it is possible to prevent estimation of a photoelectric random number due to leakage of the image from which the photoelectric random number is derived.

It should be noted that, in the case where the computation section 18 has high processing performance or where the seed frame image is small, for example, it is not mandatory to temporarily store the seed frame in the memory 16. In this case, the computation section 18 (encryption control section 85) receives a photoelectric random number, for example, from the amplitude control circuit 19 (or 19A) and generates a cipher key in step S105 after going through processing in steps S102 and S103. In this case, the deletion processing in step S106 is not necessary (needless to say, the deletion processing in step S104 is not necessary either).

In step S107 that follows, the computation section 18 deletes an existing key if there is such a key. For example, in the case where the processing illustrated in FIG. 10 is started at regular time intervals, a cipher key is stored in the memory 16 by the processing in step S108 performed in the past. In the case where such an existing cipher key is stored in the memory 16 in such a manner, the processing in step S107 deletes the existing cipher key.

By performing such processing of deleting an existing key, it is possible to prevent leakage of a cipher key used for encryption in the past, thus preventing unauthorized decryption of a signal encrypted in the past.

In step S108 that follows, the computation section 18 performs cipher key storage processing. That is, the computation section 18 performs processing of storing the cipher key generated in step S105 in the memory 16.

In response to execution of the storage processing in step S108, the computation section 18 terminates the series of processing tasks illustrated in FIG. 10.

In the imaging apparatus 1, the image data (captured image data) acquired through imaging by the array sensor 12 is encrypted by using the cipher key stored in step S108. Specifically, after the processing illustrated in FIG. 10 is terminated, the computation section 18 (encryption control section 85) sets a coefficient for each pixel based on the stored cipher key to each amplifier in the amplitude control circuit 19 (or 19A), thus allowing the image signal acquired through imaging by the array sensor 12 to be encrypted on the basis of the stored cipher key.

In the present embodiment, the array sensor 12 captures a video, and the amplitude control circuit 19 (or 19A) encrypts each of the frame images included in the video.

In the present example, captured image data as a video encrypted as described above is stored in the memory section 24 on the basis of control performed by the control section 23. The control section 23 can transmit the captured image data stored in such a manner in the memory section 24 to the reception apparatus 3 via the communication section 25.

Here, as can be understood from the description given above, in the present example, image data is encrypted on the basis of a photoelectric random number acquired during a frame period different from that of the image data to be encrypted.

This renders estimation of a cipher key from an encrypted image more difficult, thus enhancing security.

It should be noted that it is also possible to encrypt image data on the basis of a photoelectric random number acquired during the same frame period as for the image data to be encrypted.

[1-8. Passing of Key for Image Decryption]

The reception apparatus 3 receives, from the imaging apparatus 1, captured image data encrypted with a cipher key (encryption filter) generated on the basis of a photoelectric random number as described above and decrypts the received captured image data. At this time, the key used for decryption (decipher key) is the same as the key used for encryption. That is, in the present example, a common key cipher scheme is adopted. As is known, it is important to securely pass a common key in the common key cipher scheme.

Figure 11:
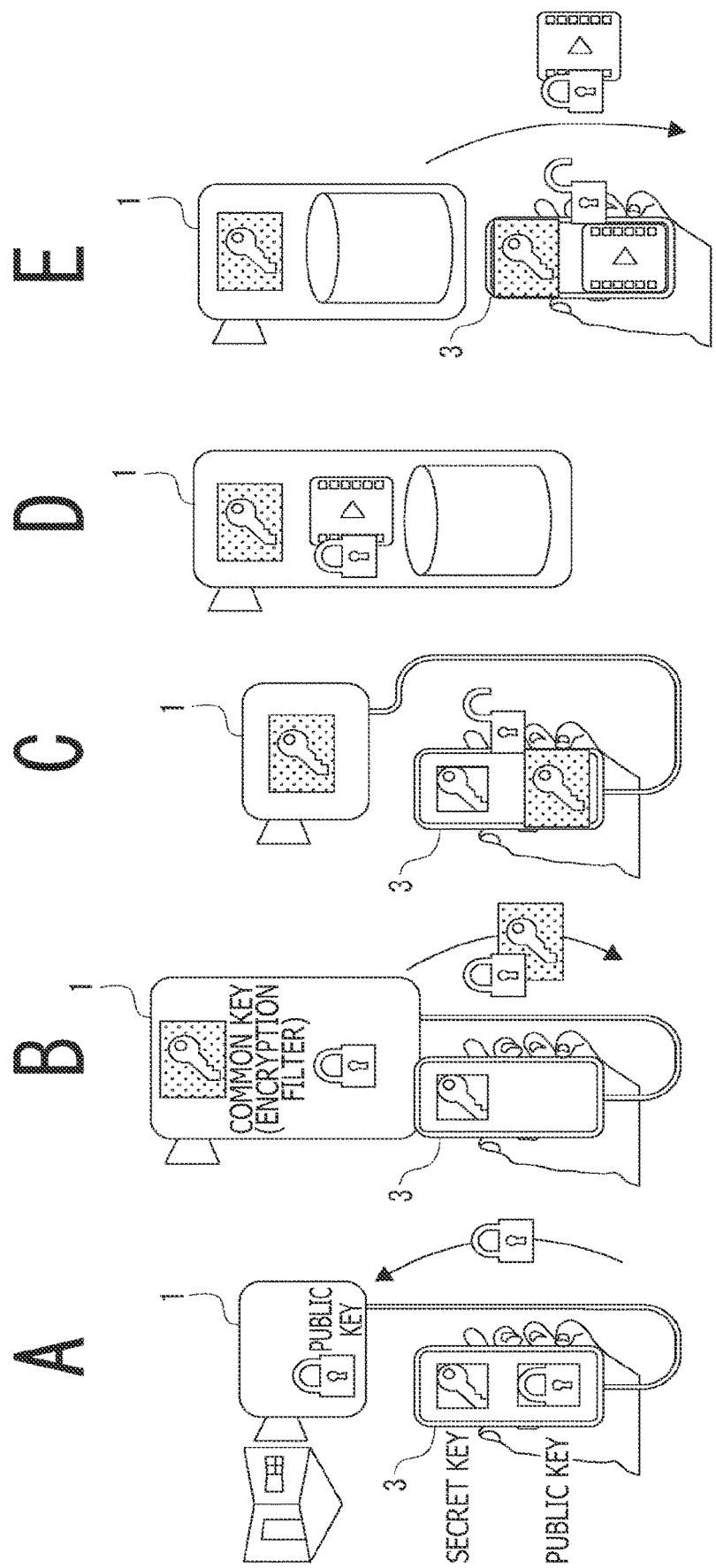
FIG. 11 illustrates diagrams for describing an example of a technique for securely passing a decipher key used for decrypting an image to the reception apparatus.

A description of an example of a technique for securely passing a key for decryption (common key) to the reception apparatus 3 will be given with reference to FIG. 11. The outline of the technique is that a common key is passed by using a public key cipher.

First, the reception apparatus 3 generates a public key and a secret key and passes the public key to the imaging apparatus 1 (FIG. 11A).

The imaging apparatus 1 that has acquired the public key uses, as a common key, a cipher key generated on the basis of a photoelectric random number as described above, encrypts the common key with the public key, and transmits the encrypted common key to the reception apparatus 3 (FIG. 11B).

Then, the reception apparatus 3 decrypts the transmitted common key (decipher key) by using the secret key created in FIG. 11A (FIG. 11C).

From here onwards, the reception apparatus 3 can rapidly decrypt the encrypted captured image data received from the imaging apparatus 1, by using the common key decrypted as described above. FIG. 11D schematically represents image encryption using a common key on the side of the imaging apparatus 1, and FIG. 11E schematically represents decryption of image data encrypted with the common key that is performed by the reception apparatus 3 using the common key.

It should be noted that, although the encryption of the common key with the public key in FIG. 11B and the decryption of the common key with the secret key in FIG. 11C each require approximately a few seconds, such encryption and decryption are required only once for each passing of a key.

[1-9. Tampering Detection Technique as First Embodiment]

As described above, in the present embodiment, captured image data transmitted from the imaging apparatus 1 to the reception apparatus 3 is data to be subjected to electronic signature.

A description of a tampering detection technique for an electronic document using electronic signature will be given here with reference to the schematic diagram in FIG. 12 for purposes of confirmation.

Figure 12:
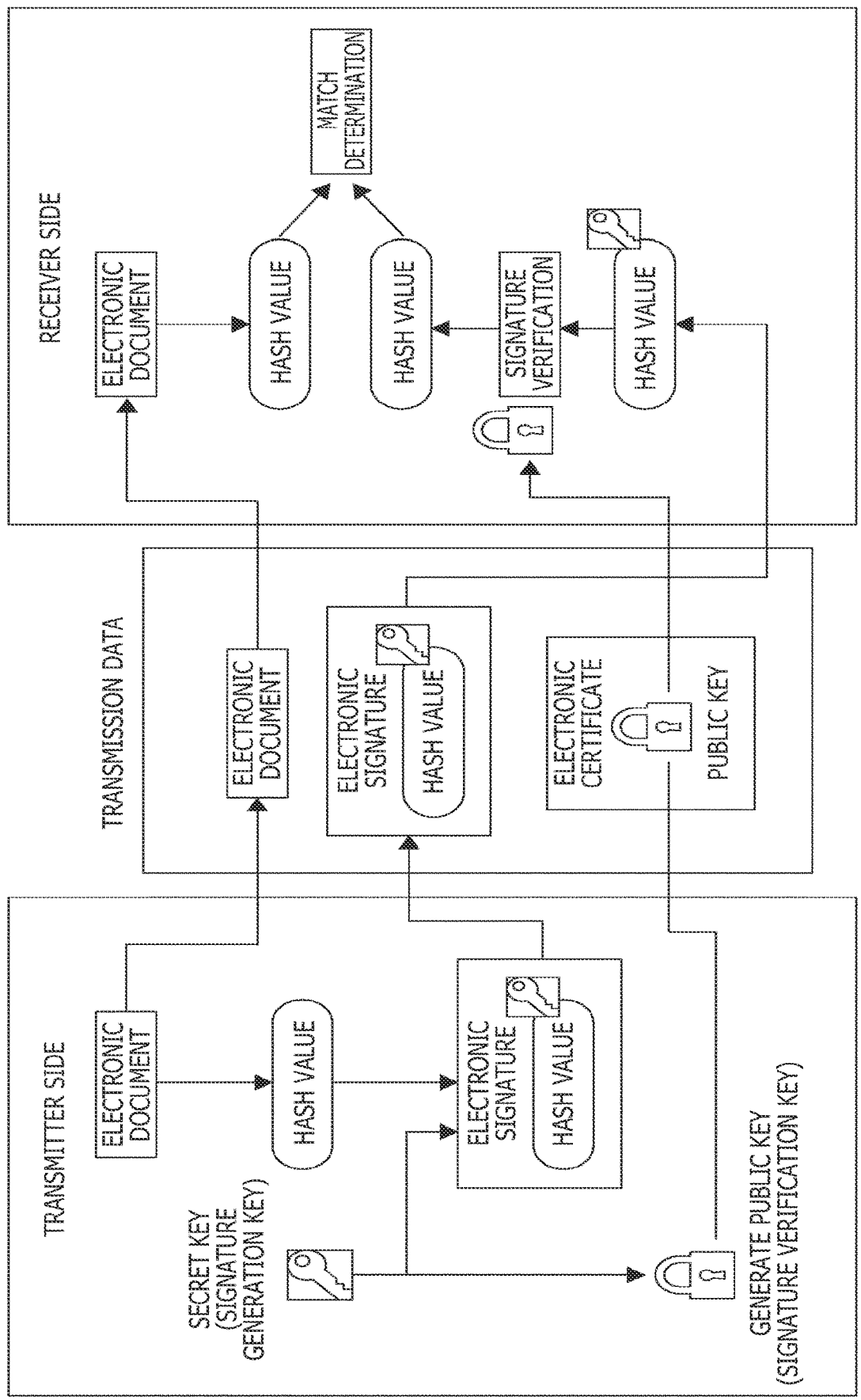
FIG. 12 is a schematic diagram for describing a tampering detection technique for an electronic document using an electronic signature.

In correspondence with embodiments, the "transmitter side" in FIG. 12 corresponds to the imaging apparatus 1, and the "receiver side" corresponds to the reception apparatus 3. Also, the "electronic document" corresponds to image data acquired by the imaging apparatus 1 (encrypted on the basis of photoelectric random number in the present example).

On the transmitter side, a hash value for the electronic document is calculated, a secret key as a signature generation key is generated, and the hash value is encrypted with the generated secret key. Further, the transmitter side generates a public key as a signature verification key on the basis of the secret key.

The transmitter side places the hash value encrypted with the secret key into transmission data as electronic signature data when transmitting the electronic document to the receiver side. Also, the transmitter side places electronic certificate data including the public key generated from the secret key into the transmission data.

The receiver side calculates a hash value of the electronic document received from the transmitter side. Also, as processing indicated as "signature verification" in FIG. 12, the receiver side decrypts, with the public key included in the electronic certificate, the hash value encrypted in the electronic signature data. Then, the receiver side performs a match determination to determine whether or not the two hash values match.

At this time, if the electronic document received by the receiver side has not been tampered with from the contents at the time of transmission, the two hash values match. Accordingly, it is possible to detect (determine) whether or not the electronic document has been tampered with by the match determination described above.

In the present embodiment, in the case where such a tampering detection technique using electronic signature is adopted, the decipherment of a secret key as a signature generation key is rendered difficult and the tampering detection performance is enhanced by generating the secret key on the basis of the photoelectric random number described above.

A description of processing of generating a cipher key for electronic signature as the first embodiment will be given with reference to the flowchart in FIG. 13.

Figure 13:
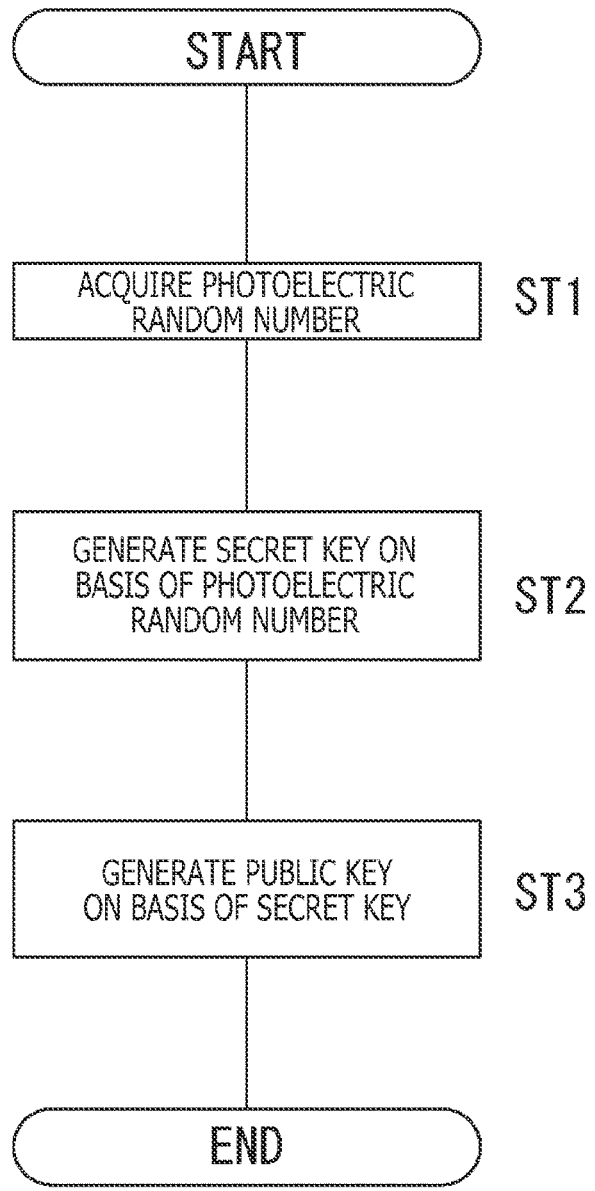
FIG. 13 is a flowchart illustrating an example of processing of generating a cipher key for electronic signature as the first embodiment.

In the present example, the processing illustrated in FIG. 13 is performed by the control section 23.

First, the control section 23 performs processing of acquiring a photoelectric random number in step ST1. It is conceivable that a new photoelectric random number generated by the imaging sensor section 10 is acquired as this photoelectric random number.

Alternatively, a photoelectric random number already generated by the imaging sensor section 10 for encryption of captured image data can also be acquired. For example, in the present example, a photoelectric random number generated on the basis of the electric signal value of each pixel is stored in the memory 16 in the cipher key generation processing in step S105 described above. The processing in step ST1 can be processing of acquiring, from the imaging sensor section 10, the photoelectric random number stored in the memory 16 in such a manner.

Here, in the case where processing of acquiring a new photoelectric random number generated by the imaging sensor section 10 is performed as the processing in step ST1, the processing illustrated in FIG. 13 can be started in response to detection of unauthorized access from external equipment by the unauthorized access detection section 86. In this case, a secret key for electronic signature is also updated on the basis of the photoelectric random number generated again, in the case where unauthorized access from external equipment is detected. Alternatively, the processing illustrated in FIG. 13 can be started on the basis of another condition such as starting of the processing at regular time intervals.

Also, in the case where a new photoelectric random number is generated by the imaging sensor section 10 for secret key generation, the control section 23 can also instruct the imaging sensor section 10 to delete, after generating the new photoelectric random number, the image data (seed frame) from which the new photoelectric random number is derived.

In step ST2 following step ST1, the control section 23 generates a secret key on the basis of the photoelectric random number. RSA (Rivest Shamir Adleman) cipher technique can be cited as an example of a technique of generating a secret key from a photoelectric random number here, but the secret key generation technique is not limited to a specific technique.

Further, in step ST3 following step ST2, the control section 23 generates a public key on the basis of the secret key. That is, the control section 23 generates a public key as a signature verification key on the basis of the secret key as a signature generation key.

Figure 14:
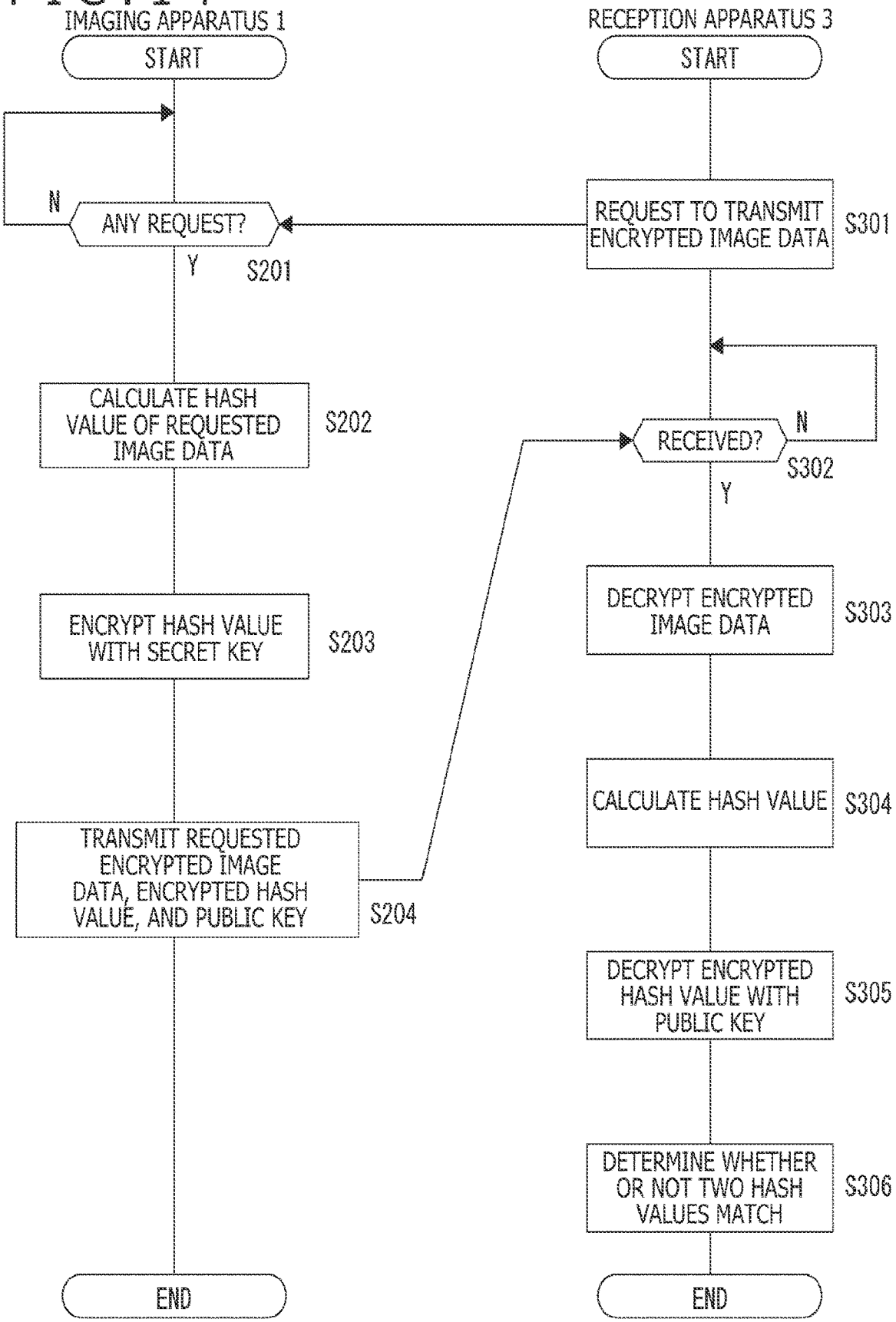
FIG. 14 is a flowchart illustrating an example of a processing procedure for detecting tampering in the first embodiment.

The flowchart in FIG. 14 illustrates an example of a processing procedure to be performed to detect tampering of captured image data on the basis of the secret key and public key generated as described above.

In FIG. 14, the processing of the imaging apparatus 1 is performed by the control section 23, and the processing of the reception apparatus 3 is performed by the CPU 31.

First, on the side of the reception apparatus 3, the CPU 31 issues a request to transmit encrypted image data to the side of the imaging apparatus 1 in step S301.

On the side of the imaging apparatus 1, the control section 23 waits for the transmission request described above in step S201, and in the case where a transmission request is issued, the control section 23 proceeds to step S202 and calculates a hash value of the image data requested by the transmission request. That is, the control section 23 calculates a hash value of the captured image data stored in the memory section 24 and requested by the transmission request. At this time, the same hash function as used by the side of the reception apparatus 3 to calculate a hash value in step S304, which will be described later, is used to calculate a hash value. SHA-1, SHA-2, and the like can be cited as examples of a hash function, but the hash function is not limited to a specific function.

In step S203 following step S202, the control section 23 encrypts the hash value with the secret key. That is, the control section 23 encrypts the hash value calculated in step S202, with the secret key generated on the basis of the photoelectric random number in the processing in FIG. 13.

Further, in step S204 that follows, the control section 23 transmits the requested encrypted image data, the encrypted hash value, and the public key to the reception apparatus 3 that has issued the request. That is, the control section 23 transmits the encrypted captured image data whose transmission has been requested, the hash value encrypted in step S203, and the public key generated in the processing in FIG. 13, to the reception apparatus 3 that has issued the request.

On the side of the reception apparatus 3, the CPU 31 waits in step S302 to receive data transmitted in step S204, and in the case where the data is received, the CPU 31 decrypts the encrypted image data first in step S303. That is, the CPU 31 decrypts the captured image data encrypted with a cipher key (encryption filter) based on a photoelectric random number, with the same cipher key (decipher key) acquired in advance by the imaging apparatus 1. In the present example, the cipher key as an encryption filter is securely acquired in advance by the reception apparatus 3 from the imaging apparatus 1 by the technique illustrated in FIG. 11 or the like.

In step S304 following step S303, the CPU 31 calculates a hash value for the captured image data decrypted in step S303, as processing of calculating a hash value.

Next, in step S305, the CPU 31 decrypts the encrypted hash value with the public key. That is, the CPU 31 decrypts the encrypted hash value received from the side of the imaging apparatus 1, with the public key received also from the side of the imaging apparatus 1.

Then, in step S306, the CPU 31 determines whether or not the two hash values match, i.e., determines whether or not the hash value calculated in step S304 and the hash value decrypted in step S305 match. Whether or not the captured image data has been tampered with is determined through this match determination.

2. Second Embodiment

[2-1. Image Encryption Technique of Second Embodiment]

Next, a description of a second embodiment will be given.

It should be noted that the redundant description of the configurations of the imaging apparatus 1 and the reception apparatus 3 will be omitted in the second embodiment because these configurations are similar to those described in the first embodiment. In the description given below, portions similar to those that has already been described will be denoted by the same reference signs, and the description thereof will be omitted.

In the second embodiment, a target region of image data is encrypted. Specifically, in the second embodiment, an entire image and a target region are encrypted on the basis of different cipher keys, and a region of a specific part and the other region that are included in the target region are encrypted on the basis of different cipher keys, thus gradually changing a confidentiality level of information depending on the difference in decipher key possessed by the image receiver side.

FIGS. 15 and 16 are diagrams illustrating a conception of gradual image encryption in the second embodiment.

FIG. 15 illustrates a conception of gradual image encryption in the case where a target class is a person.

FIG. 15A illustrates an image before encryption. In this case, a target region AT is an entire region where the person appears in the image. Also, in this case, a specific region AS which is a region of a specific part is a facial region of the person.

FIG. 15B illustrates an image in which only the specific region AS is encrypted. FIG. 15C illustrates an image in which only the target region AT including the specific region AS is encrypted. FIG. 15D illustrates an image in which an entire region of the image is encrypted.

FIG. 16 illustrates a conception of gradual image encryption in the case where the target class is a vehicle, and FIG. 16A illustrates an image before encryption.

In this case, the target region AT is an entire region where the vehicle appears in the image, and the specific region AS is a region of a vehicle's passenger and a license plate.

FIG. 16B illustrates an image in which only the specific region AS is encrypted. FIG. 16C illustrates an image in which only the target region AT including the specific region AS is encrypted. FIG. 16D illustrates an image in which an entire region of the image is encrypted.

In the case of these FIGS. 15 and 16, at least three types of cipher keys, that is, a first cipher key corresponding to encryption of the entire image region, a second cipher key corresponding to encryption of only the target region AT, and a third cipher key corresponding to encryption of only the specific region AS, are generated.

Figure 17:
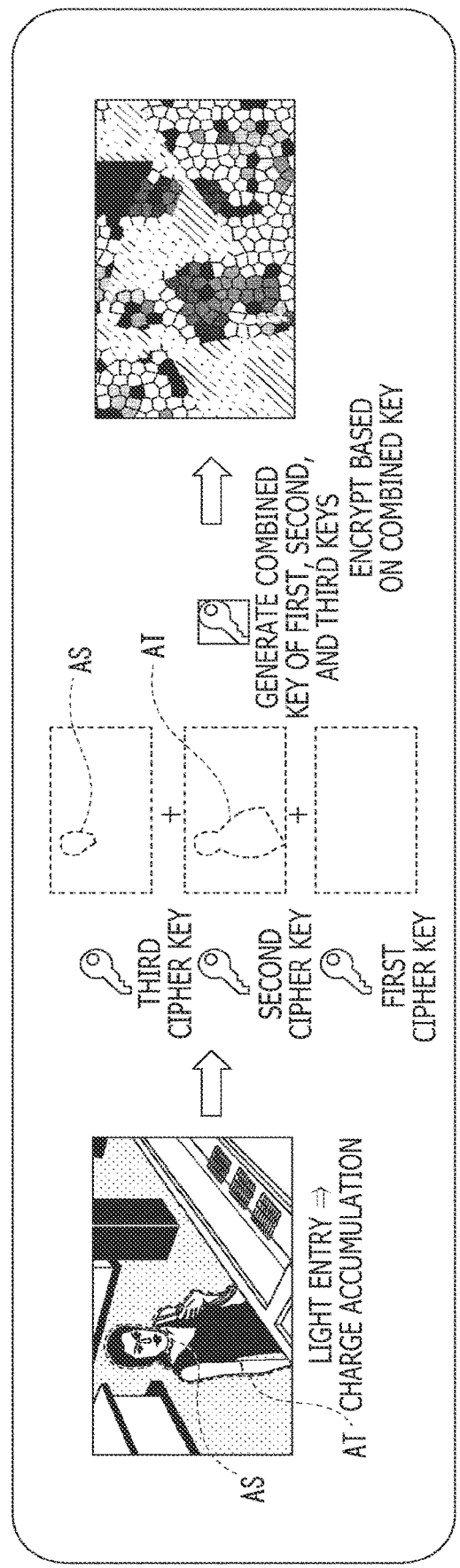
FIG. 17 is a diagram describing an example of a specific technique for gradual image encryption.

FIG. 17 is a diagram describing an example of a specific technique for gradual image encryption.

In the present example, a target image is not subjected to the encryption based on the first, second, and third cipher keys individually. Instead, the target image is encrypted on the basis of a combined key acquired by combining the multiple cipher keys.

First, the third cipher key for encryption of the specific region AT, the second cipher key for encryption of the entire target region AT, and the first cipher key for encryption of the entire image region are each made ready. In generating these three types of cipher keys, three types of photoelectric random numbers may be acquired (i.e., three types of seed frames may be captured). Instead, however, in the present example, three types of cipher keys are generated from a common photoelectric random number to reduce the time required to generate cipher keys. Specifically, in the present example, in generating three types of cipher keys, three types of random numbers (hereinafter denoted as the first random number, the second random number, and the third random number) are first generated that have different arrangements of pixel-by-pixel values in the common random number.

Then, the third cipher key is generated as a cipher key acquired by extracting values of the respective pixels in the specific region AS from values of the third random number.

Also, the second cipher key is generated as a cipher key acquired by extracting values of the respective pixels in the target region AT from values of the second random number.

The first cipher key is generated as a cipher key acquired by applying the first random number as is.

In addition, a cipher key that is acquired by combining the first, second, and third cipher keys is generated as a combined key as illustrated.

Then, the target image is encrypted on the basis of the combined key.

By performing the gradual encryption as described above, it is possible to change the confidentiality level of information depending on the difference in decipher key possessed by the image receiver side (side of the reception apparatus 3).

Figure 18:
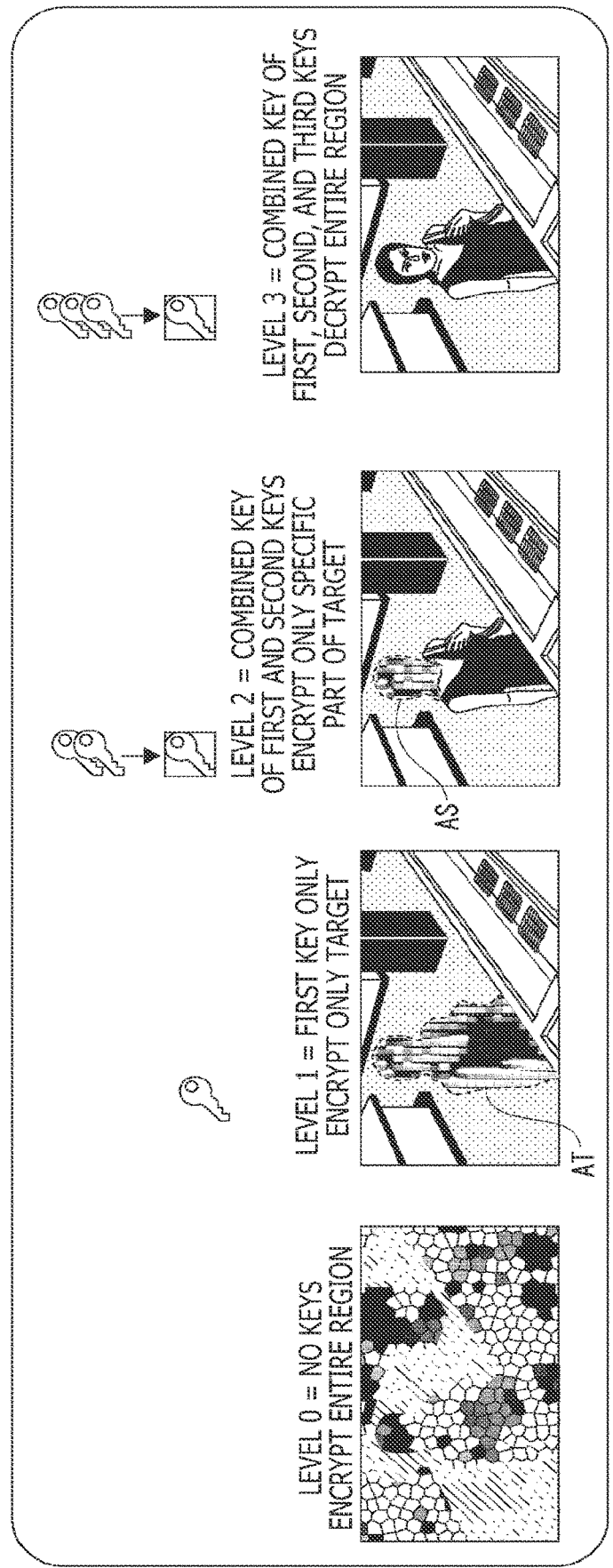
FIG. 18 is an explanatory diagram regarding a modification example of a confidentiality level.

FIG. 18 is an explanatory diagram regarding a modification example of the confidentiality level.

Here, four levels including level 0 to level 3 are defined as levels regarding the possession of a key. As illustrated, level 0 means that there is no key. Level 1 means that only the first cipher key is possessed, level 2 means that a combined key of the first and second cipher keys is possessed, and level 3 means that a combined key of the first, second, and third cipher keys is possessed.

In the case of level 0, the encrypted image cannot be decrypted by the image reception side, and an image whose entire region is encrypted is acquired.

In the case of level 1, the image receiver side can decrypt the region other than the target area AT by using the first cipher key. Accordingly, an image in which only the target region AT is encrypted is acquired.

In the case of level 2, the image receiver side can decrypt the region other than the specific region AS by using the combined key of the first and second cipher keys. Accordingly, an image in which only the specific region AS in the target is encrypted is acquired.

In the case of level 3, the image receiver side can decrypt the entire region of the image by using the combined key of the first, second, and third cipher keys.

Accordingly, in this case, an image with no hidden information can be acquired.

Here, in the present example, an image to be encrypted is a video. Accordingly, there is a possibility that an object that appears in the image as a target may change its position in the image over time. Accordingly, in the case where the target region AT is encrypted as described above, it is necessary to track the target.

A description of an example of a specific technique for image encryption including such tracking of a target as the second embodiment will be given with reference to FIG. 19.

Figure 19:
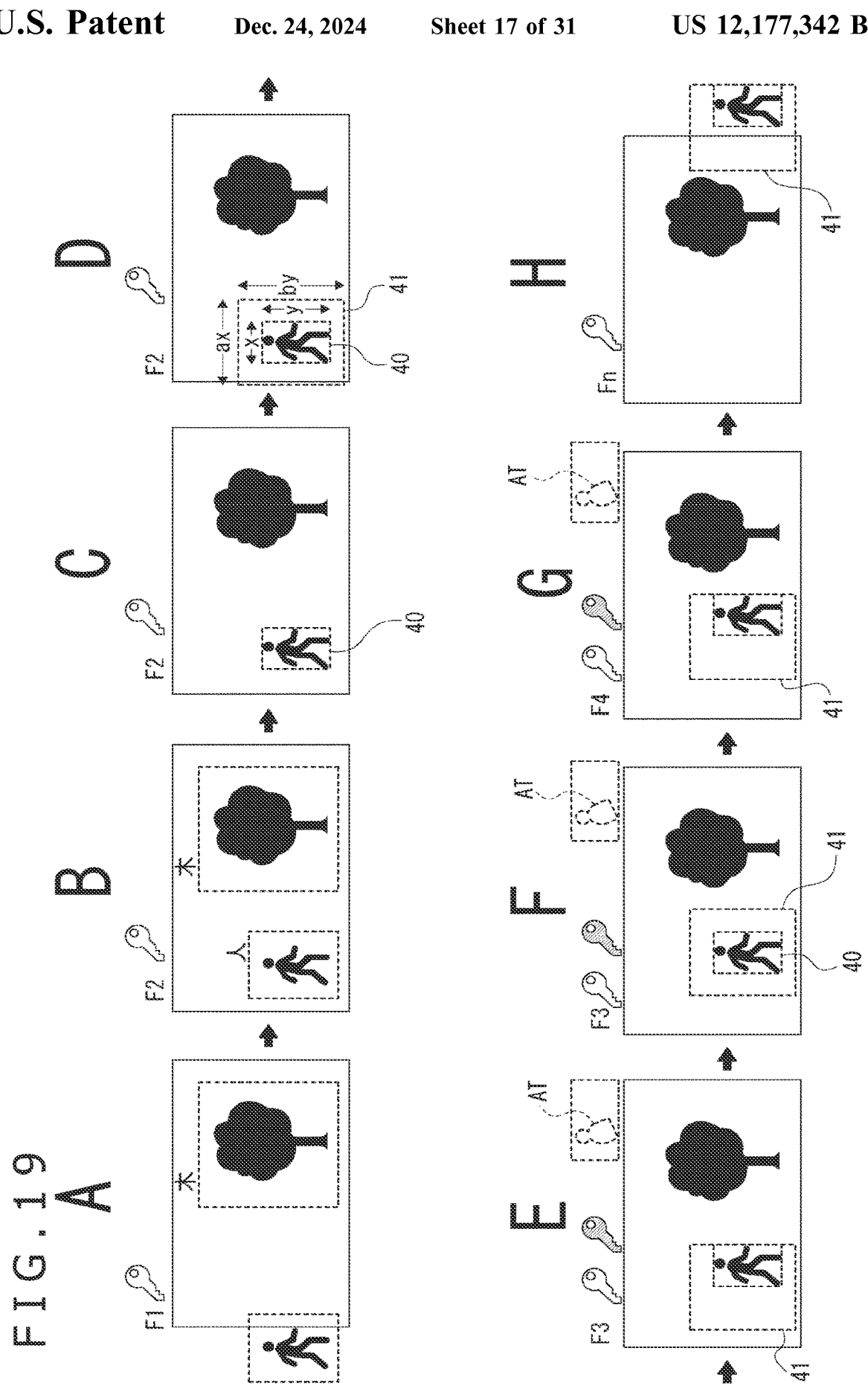
FIG. 19 illustrates diagrams for describing an example of a specific technique for image encryption as a second embodiment.

It should be noted that the target class is a "person" in FIG. 19. Also, for convenience of description in FIG. 19, an example will be given in which no distinction is made between the specific region AC and the other region in the target region AT and in which only the target region AT and the other region are encrypted separately.

First, a frame F1 in FIG. 19A illustrates a state in which a person as a target class has yet to come into the frame. It should be noted here that an object as a "tree" that is not a target class is identified in the image in the example.

Here, the entire region of the image is encrypted regardless of whether or not there is a target. That is, in the present example, the image in each frame F is first encrypted by the amplitude control circuit 19 (or 19A) on the basis of the first cipher key corresponding to the entire region of the image and is then stored in the memory 16. A hollow key mark illustrated in each subfigure of FIG. 19 indicates that an entire region of the image is encrypted in such a manner as an output image.

In order to track the target, the computation section 18 detects the object region and identifies the class in the image (processing of the object region recognition section 82 and the class identification section 83 described above). In order to perform these processing tasks, the computation section 18 decrypts the frame image encrypted and stored as described above. That is, the computation section 18 performs the processing for tracking the target while decrypting the frame image encrypted on the basis of the first cipher key.

At this time, the computation section 18 performs on-the-fly decryption. This makes it possible to reduce the possibility that an image signal in a clear text form may leak during tracking of the target, thus enhancing security.

A frame F2 in FIG. 19B illustrates a state in which the "person" as the target class has come into the frame. In this state, the "person" as the target class is identified together with the "tree" that has already been identified.

In the case where an object as a target class is identified as described above, the computation section 18 (object region recognition section 82) calculates a bounding box 40 at correct position coordinates that surrounds an area of the object in question.

For example, FIG. 19C illustrates an example of the bounding box 40 in an image in which a person is a target class. That is, the bounding box 40 is calculated as a more accurate region of an object that falls under the category of the target class.

Further, the computation section 18 (object region recognition section 82) calculates an ROI 41 which is a region of interest, on the basis of the bounding box 40.

FIG. 19D illustrates the ROI 41 and the bounding box 40. The ROI 41 is calculated, for example, by enlarging the vertical and horizontal size of the bounding box 40 (x×y), that is, by (ax×by). Horizontal and vertical enlargement scales a and b can be set separately. Although an enlargement ratio may be fixed, it is conceivable that the enlargement ratio is specified from equipment (e.g., image processor 21) external to the imaging sensor section 10.

In the present example, the ROI 41 is encrypted as the target region AT with a cipher key different from that for the entire region of the image.

Here, the frame F2 is a frame in which a new target class is identified in the image, and can, in other words, be said to be a target class discovery frame.

In the present example, a technique of encrypting signals read from the pixels is adopted. Accordingly, the ROI 41 of a target class discovery frame cannot be encrypted on the basis of a second cipher key. The target class discovery frame has already been encrypted on the basis of a first cipher key and stored in the memory 16. If a target class discovery frame that has already been encrypted on the basis of only a first cipher key as described above is output as is, the image region of the ROI 41 will be disclosed to those who possess only the first cipher key without being hidden.

Accordingly, in the present example, the target class discovery frame is deleted from the memory 16, thus realizing an appropriate information confidentiality level depending on the difference in decipher key possessed by the image receiver side.

FIG. 19E illustrates a frame F3 which is a next frame of the frame F2.

Starting from the frame F which is a next frame of a target class discovery frame, the ROI 41 is encrypted on the basis of a second cipher key. Here, the ROI 41 is the one calculated at the time of the frame F2 which is a target class discovery frame.

In the case where the "person" as a target class moves, the person advances more toward the direction of motion in the frame F3 than in the frame F2. However, the person as a target class fits into the ROI 41 in the frame F3 if the ROI 41 is sized to occupy an area larger than that of the bounding box 40. That is, the person as a target class fits into an area to be encrypted on the basis of the second cipher key.

In frames that follow the frame F3, the bounding box 40 and the ROI 41 for the target class are similarly calculated, thus allowing the target class to be tracked (refer to FIG. 19F).

Then, in frames that follow the frame F4, the ROI 41 calculated in the previous frame F is encrypted on the basis of the second cipher key, similarly to the frame F3 (refer to FIG. 19G).

FIG. 19H illustrates a frame Fn after the "person" as a target class has gone out of the frame. As the target class has gone out of the frame, the ROI 41 is no longer calculated. Accordingly, the image of the frame Fn is encrypted only on the basis of the first cipher key.

It should be noted that, although an example has been described above in which a rectangular region acquired by enlarging the bounding box 40 is used as the ROI 41, the ROI 41 is not limited to a rectangular region.

For example, the ROI 41 may be calculated, for example, by semantic segmentation, that is, by detecting an object area on a pixel level and calculating the ROI 41 from the object area of the target class thereof.

Figure 20:
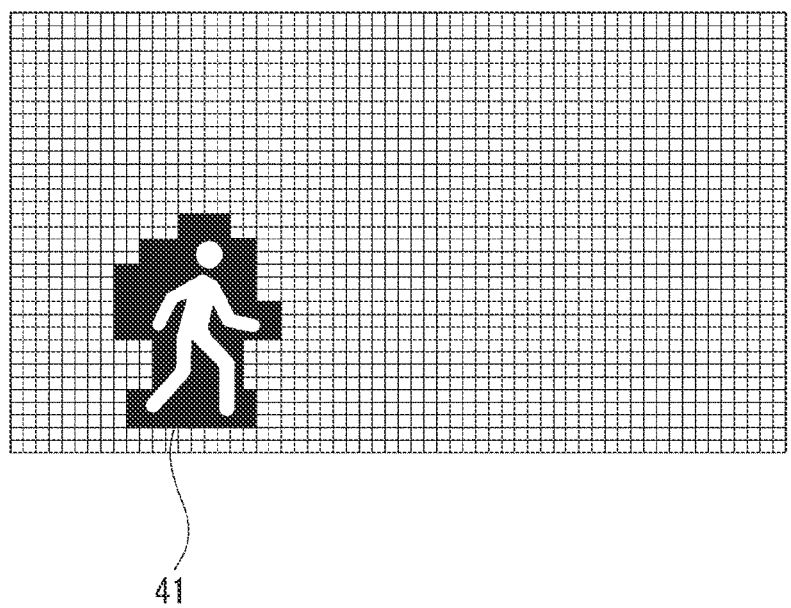
FIG. 20 is a diagram for describing a modification example of an ROI in the second embodiment.

FIG. 20 illustrates the ROI 41 based on the semantic segmentation. This is an example in which the non-rectangular ROI 41 has been set by expanding a pixel region as an object (e.g., person).

For example, there are cases where part of a truck having protrusions, a person riding a bicycle, or the like cannot be included in the rectangular ROI 41 and where the rectangular ROI 41 is excessively large. By generating the non-rectangular ROI 41 according to the pixel-level object position, it is possible to adequately set a hidden region associated with the target, with no deficiency or excess.

[2-2. Processing Procedure for Image Encryption]

A description of a processing procedure performed by the computation section 18 to realize image encryption as the second embodiment described above will be given with reference to the flowcharts in FIGS. 21 and 22.

Figure 21:
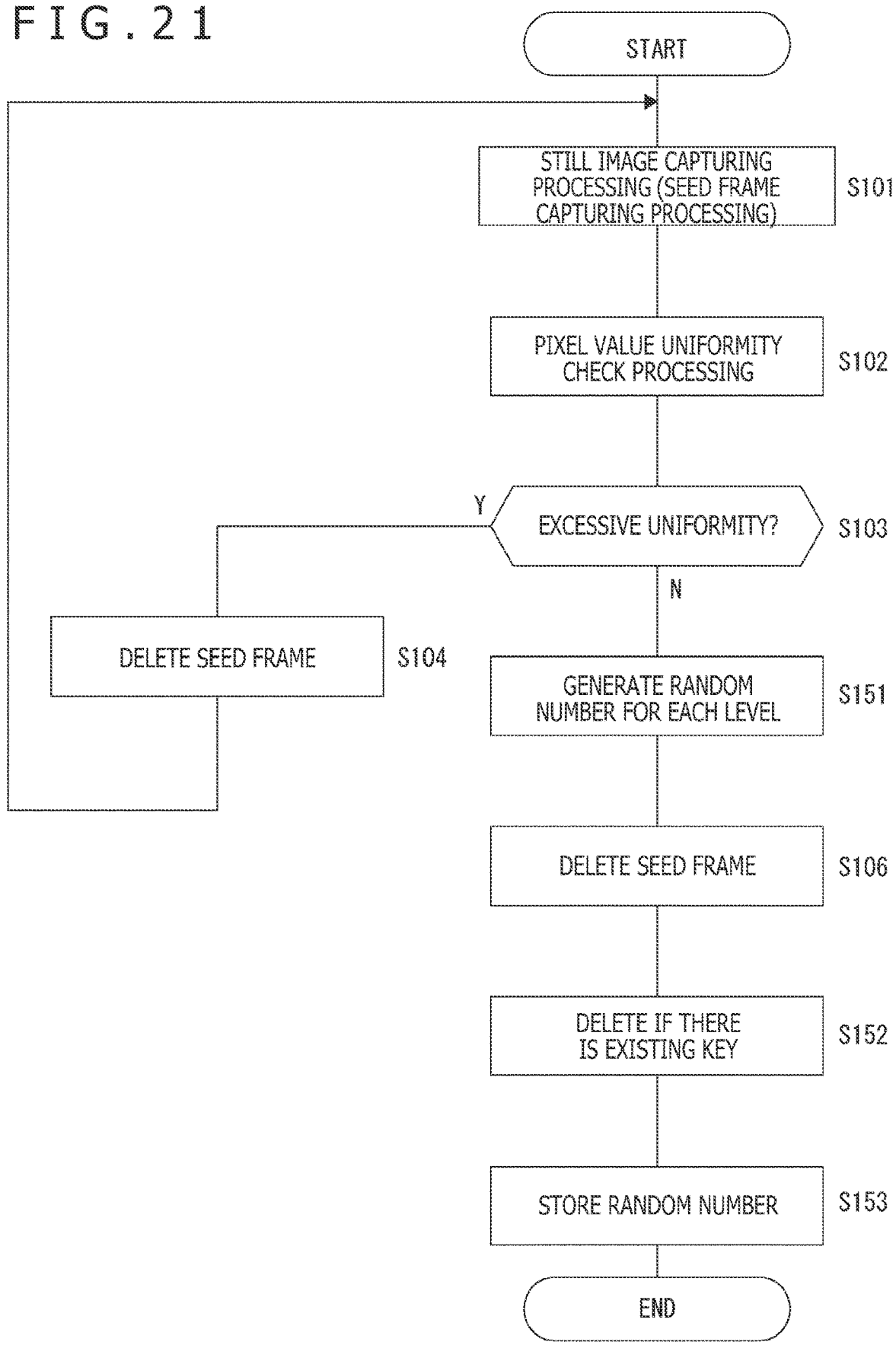
FIG. 21 is a flowchart illustrating processing corresponding to steps from imaging of a seed frame to storage of a random number from which a cipher key is derived in the second embodiment.

FIG. 21 illustrates processing corresponding to steps from imaging of a seed frame to storage of a random number from which a cipher key is derived. It should be noted that, in FIG. 21, steps similar to those that have already been described in FIG. 10 will be assigned the same step numbers, and the description thereof will be omitted.

Similarly to the processing in FIG. 10, the processing in FIG. 21 is started at the time of startup and in response to detection of unauthorized access by the unauthorized access detection section 86. Alternatively, the processing can also be started on the basis of another condition such as starting of the processing at regular time intervals.

Figure 22:
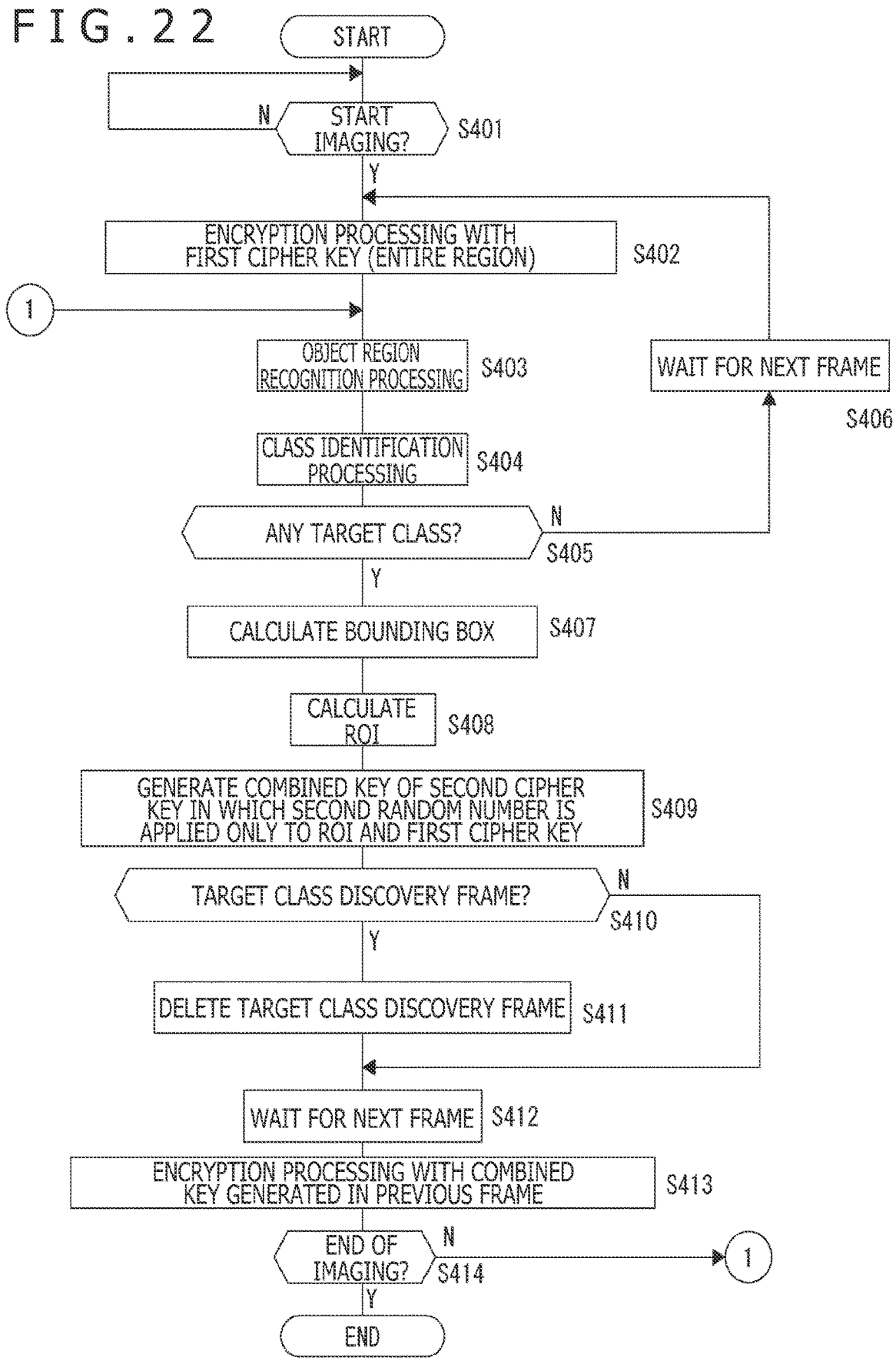
FIG. 22 is a flowchart illustrating processing of encrypting a target image on the basis of the cipher key generated in the second embodiment.

It should be noted that at least some of the tasks of the processing illustrated in FIGS. 21 and 22 can be realized by hardware.

In FIG. 21, the computation section 18 in this case proceeds to step S151 and generates a random number for each level in the case where the uniformity is determined as excessive in step S103. Here, the specific region AS is not differentiated in the target region AT. Accordingly, two types of random numbers, that is, the first random number and the second random number, are generated as described above.

It should be noted that the technique of generating various types of random numbers on the basis of photoelectric random numbers of a seed frame has already been described. Accordingly, redundant description will be omitted.

The computation section 18 in this case performs processing of deleting the seed frame in step S106, in response to execution of the random number generation processing in step S151.

Then, the computation section 18 performs processing of deleting an existing random number if there is such a random number in step S152, in response to execution of the deletion processing in step S106. That is, if there are random numbers of the respective levels (first random number and second random number) that have been stored in the memory 16 as a result of processing in step S153 performed in the past, these random numbers are deleted by this processing.

In step S153 following step S152, the computation section 18 performs processing of storing the random numbers of the respective levels generated in step S151 in the memory 16 and terminates the series of processing tasks illustrated in FIG. 21.

FIG. 22 illustrates processing of encrypting a target image on the basis of the cipher key generated in the second embodiment.

First, the computation section 18 waits in step S401 for the start of capturing of an image to be encrypted, and when the imaging starts, the computation section 18 performs encryption processing with the first cipher key in step S402. That is, the computation section 18 specifies a coefficient for each pixel based on the first cipher key to the amplitude control circuit 19 (or 19A) and causes the amplitude control circuit 19 (or 19A) to encrypt the signals read from the array sensor 12. As can be understood from the description given above, in the present example, a cipher key acquired by applying the first random number as is used as the first cipher key.

The computation section 18 performs object region recognition processing in step S403 following step S402 and further performs class identification processing in step S404 that follows. The object region recognition processing in step S403 is processing of the object region recognition section 82 described above, and processing of detecting a potential object from a current frame image and identifying the region of that object is performed. Also, the class identification processing in step S404 is processing of the class identification section 83 described above, and the class of the object detected by the object region recognition processing as described above is identified. In the case where multiple objects or multiple types of objects are detected, the class of each thereof is identified for classification. For example, in the case of FIG. 19B described above, the classes of the objects are identified for classification in such a manner that there is one object whose class is a "tree" and another object whose class is a "person."

It should be noted that the computation section 18 performs the processing in steps S403 and S404 while on-the-fly decryption is performed on the frame image encrypted in step S402 or step S413 which will be described later.

In step S405 following step S404, the computation section 18 determines whether or not there is a target class. That is, the computation section 18 determines whether or not there is a target class among the classes identified in step S404.

If there is no target class, the computation section 18 waits for a next frame (waits for arrival of a next frame period) in step S406 and then returns to step S402. That is, until a target class is detected, the entire image region encryption processing in step S402, the object region recognition processing in step S403, and the class identification processing in step S404 are repeated every frame.

In the case where it is determined in step S405 that there is a target class, the computation section 18 proceeds to step S407 and calculates the bounding box 40. Then, the computation section 18 calculates the ROI 41 in step S408 that follows.

Further, in step S409 that follows, the computation section 18 generates a combined key of a first cipher key and a second cipher key which is acquired by applying the value of a second random number only to the ROI 41.

The computation section 18 determines in step S410 whether or not the current frame is a target class discovery frame, in response to generation of the combined key in step S409. If the current frame is a target class discovery frame, the computation section 18 performs processing of deleting the target class discovery frame in step S411. This prevents the image portion of the target from being left unhidden for the target class discovery frame despite the fact that the level of the key possessed is level 1.

In step S410, if the current frame is not a target class discovery frame, the computation section 18 omits the deletion processing in step S411 and performs processing of waiting for a next frame in step S412. Even in the case where the deletion processing is performed in step S411, the computation section 18 also performs the processing of waiting for a next frame in step S412.

In response to execution of the wait processing in step S412, the computation section 18 performs encryption processing with the combined key generated in the previous frame in step S413. That is, the computation section 18 specifies a coefficient for each pixel based on the combined key to the amplitude control circuit 19 (or 19A) and causes the amplitude control circuit 19 (or 19A) to encrypt the signals read from the array sensor 12.

In step S414 following step S413, the computation section 18 determines whether or not the imaging should be terminated, that is, whether or not the capturing of an image to be encrypted should be terminated, for example, due to an instruction issued from external equipment to terminate the imaging.

If the imaging is not terminated, the computation section 18 returns to step S403. This ensures that the processing steps described so far will be repeated until the imaging is terminated. That is, if there is still a target class, the calculation of the ROI 41 for the target class in question, the generation of the combined key based on the calculated ROI 41, and the encryption processing based on the combined key generated in the previous frame are performed. In the case where there is no longer a target class, the encryption processing with the first cipher key is performed instead of the encryption processing with the combined key.

If the imaging is terminated, the computation section 18 terminates the series of processing tasks illustrated in FIG. 22.

It should be noted that, in the present example, the ROI 41 has a region acquired by enlarging the bounding box 40 so as to include an object as a target in the next frame, and it is conceivable that the scales a and b for enlarging the vertical and horizontal size (x×y), that is, for calculating (ax×by), may be set according to a frame rate.

For example, if the frame rate is low, the frame intervals are long and the amount of movement of the object such as person is great. Accordingly, it is conceivable that the ROI 41 is expanded more than that in the case where the frame rate is high.

It should be noted that, in the case where encryption is performed with distinction made between a region of a specific part and the other region of the target region AT, the bounding box 40 and the ROI 41 are calculated by a similar technique to that described above for the specific part, and then, a third cipher key is generated that is acquired by applying a third random number to the calculated ROI 41. After that, it is only necessary to generate a combined key of the first, second, and third cipher keys and use the combined key to encrypt the next frame image.

[2-3. Tampering Detection Technique as Second Embodiment]

A description will be given next of a technique for performing tampering detection using electronic signature, to deal with the case where captured image data is encrypted in such a manner that the image area that can be decrypted varies from one level of the key possessed by the side of the reception apparatus 3 to another level as described above.

At this time, it is important to note that the side of the reception apparatus 3 can decrypt only the image area of the encrypted image appropriate to the level of the key possessed by the reception apparatus 3 itself. The hash value calculated from the decrypted image varies among the reception apparatuses 3 that possess keys of different levels. Accordingly, a hash value appropriate to each level of the key is calculated on the side of the imaging apparatus 1 to allow each reception apparatus 3 to perform the tampering detection processing properly even if any level of the key is used.

A description of a tampering detection technique that factors in such a difference in level of the key possessed by the side of the reception apparatus 3 as a second embodiment will be given with reference to FIGS. 23 and 24.

Here, for the purpose of description, an example will be given in which encrypted image data and electronic signature data are transmitted to the reception apparatuses 3 that possess key level 1 and key level 2, respectively. As described above with reference to FIG. 18, as a possessed key level, level 1 is a level that provides an image in which only the entire target region AT is encrypted, and level 2 is a level that provides an image in which only the specific region AS of the target region AT is encrypted.

Figure 23:
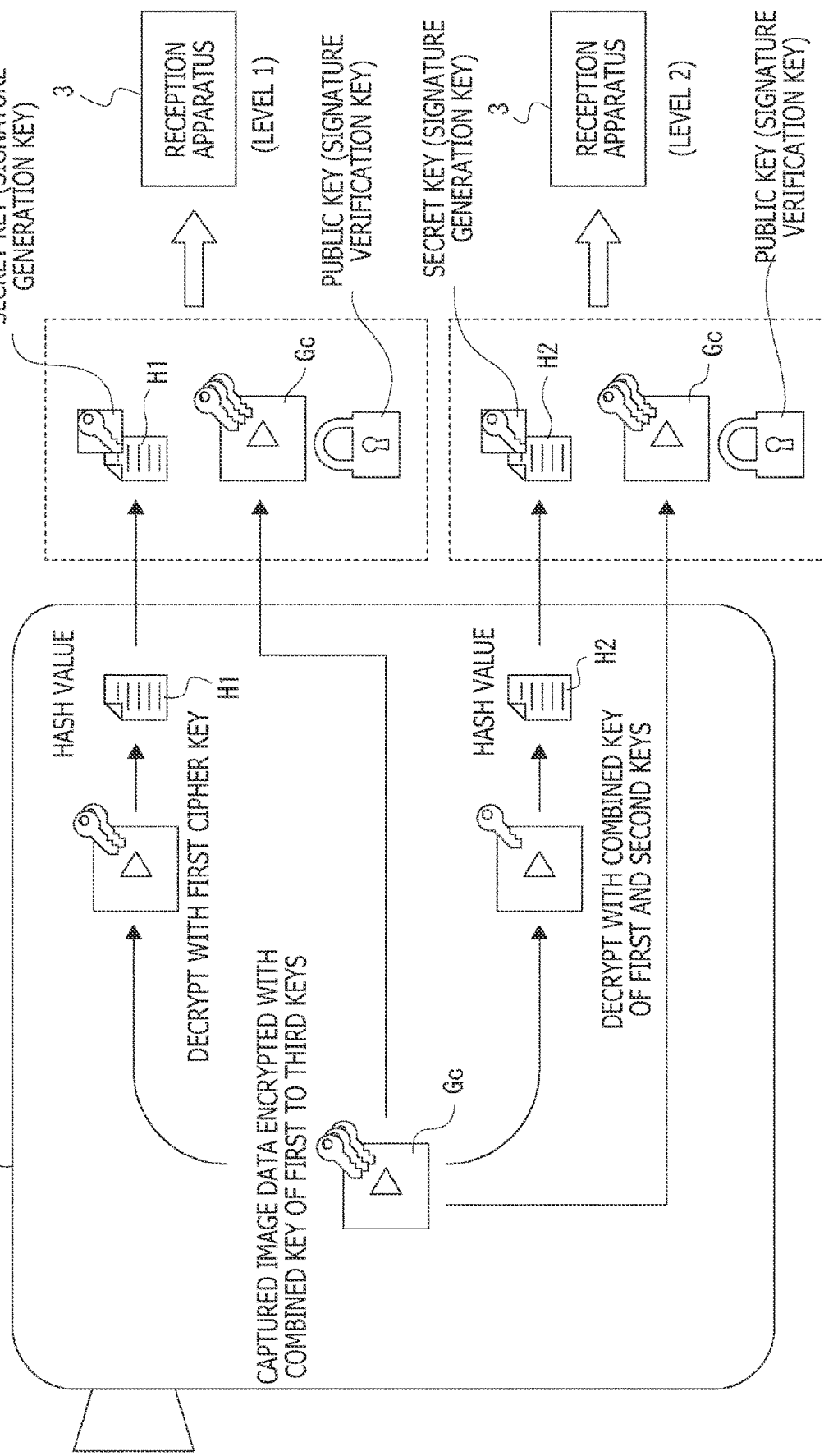
FIG. 23 is a diagram for describing a tampering detection technique as the second embodiment.

FIG. 23 schematically illustrates processing performed during transmission of an image from the imaging apparatus 1 to the reception apparatus 3.

First, in the present example, captured image data to be transmitted is image data encrypted with a combined key of the first, second, and third cipher keys. For the purpose of description, the captured image data encrypted with the combined key will be denoted below as "encrypted image data Gc."

The imaging apparatus 1 calculates a hash value of image data acquired by decrypting the encrypted image data Gc with the first cipher key (hereinafter denoted as a "hash value H1"), as a hash value to be transmitted to the reception apparatus 3 of level 1. The imaging apparatus 1 transmits, to the reception apparatus 3 of level 1, not only a value acquired by encrypting the hash value H1 calculated in such a manner with a secret key as a signature generation key (generated on the basis of a photoelectric random number, similarly to the first embodiment) but also a public key as a signature verification key generated on the basis of the secret key, together with the encrypted image data Gc.

Meanwhile, the imaging apparatus 1 calculates a hash value of image data acquired by decrypting the encrypted image data Gc with a combined key of the first and second cipher keys (hereinafter denoted as a "hash value H2"), as a hash value to be transmitted to the reception apparatus 3 of level 2. Then, the imaging apparatus 1 transmits, to the reception apparatus 3 of level 2, a value acquired by encrypting the hash value H2 calculated in such a manner with a secret key as a signature generation key and a public key as a signature verification key, together with the encrypted image data Gc.

Figure 24:
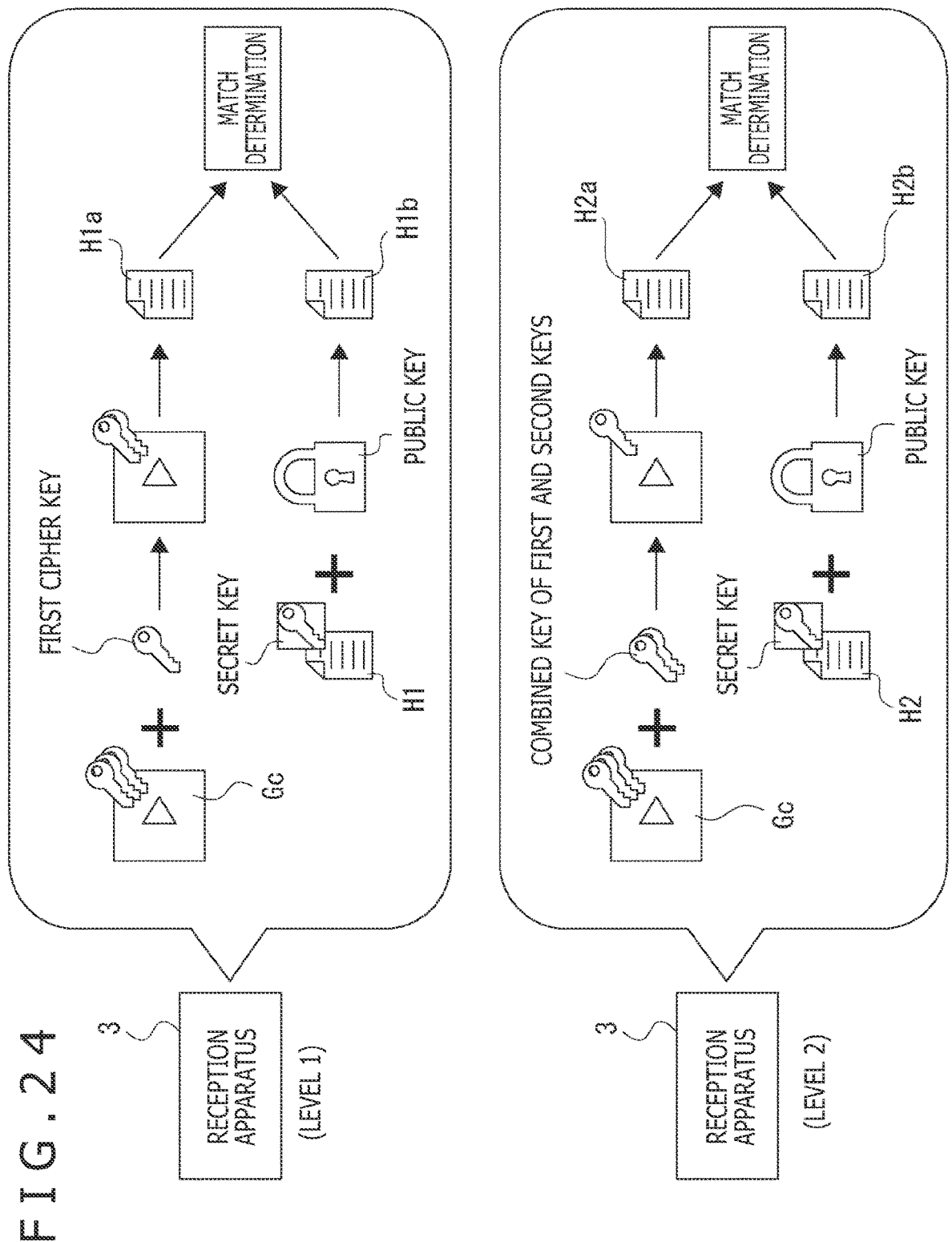
FIG. 24 is also a diagram for describing the tampering detection technique as the second embodiment.

FIG. 24 schematically illustrates processing on the side of the reception apparatus 3.

The reception apparatus 3 of level 1 decrypts the encrypted image data Gc received from the imaging apparatus 1 with the first cipher key possessed by itself and calculates a hash value of the decrypted image data (hereinafter denoted as a "hash value H1$a$"). Also, the reception apparatus 3 of level 1 decrypts, with the public key, the hash value H1 received from the imaging apparatus 1 and encrypted with the secret key. This value acquired by the decryption will be denoted as a hash value H1$b$. Then, the reception apparatus 3 of level 1 determines whether or not the hash value H1$a$ and the hash value H1$b$ match.

The reception apparatus 3 of level 2 decrypts the encrypted image data Gc received from the imaging apparatus 1 with the combined key of the first and second cipher keys possessed by itself and calculates a hash value of the decrypted image data (hereinafter denoted as a "hash value H2$a$"). Further, the reception apparatus 3 of level 2 decrypts, with the public key, the hash value H2 received from the imaging apparatus 1 and encrypted with the secret key. Letting the value acquired by this decryption be denoted as a hash value H2$b$, the reception apparatus 3 of level 2 determines whether or not the hash value H2$a$ and the hash value H2$b$ match.

Here, it is common in an electronic signature technique that a hash value is generated during recording of data to be subjected to tampering detection. However, as in the present example, in the case where a technique is used that varies the image area that can be decrypted according to the level of the key on the side of the reception apparatus 3, it is necessary to generate a hash value for each level (H1 and H2 in the example described above). An attempt to generate these hash values all at once during recording of captured image data leads to time-consuming processing, possibly giving rise to delayed processing.

Accordingly, in the present example, the hash value of each level is generated during transmission of the encrypted image data Gc based on a transmission request from the reception apparatus 3. This ensures that a hash value need only be generated when a transmission request is issued and on the basis of the key level of the reception apparatus 3 that has issued the transmission request, thus eliminating the need to generate all hash values of the respective levels at once during recording of captured image data.

Accordingly, it is possible to keep delayed processing associated with hash value generation to a minimum.

A description of an example of a processing procedure performed on the side of the imaging apparatus 1 to realize the tampering detection technique as the second embodiment described above will be given with reference to the flowchart in FIG. 25.

Figure 25:
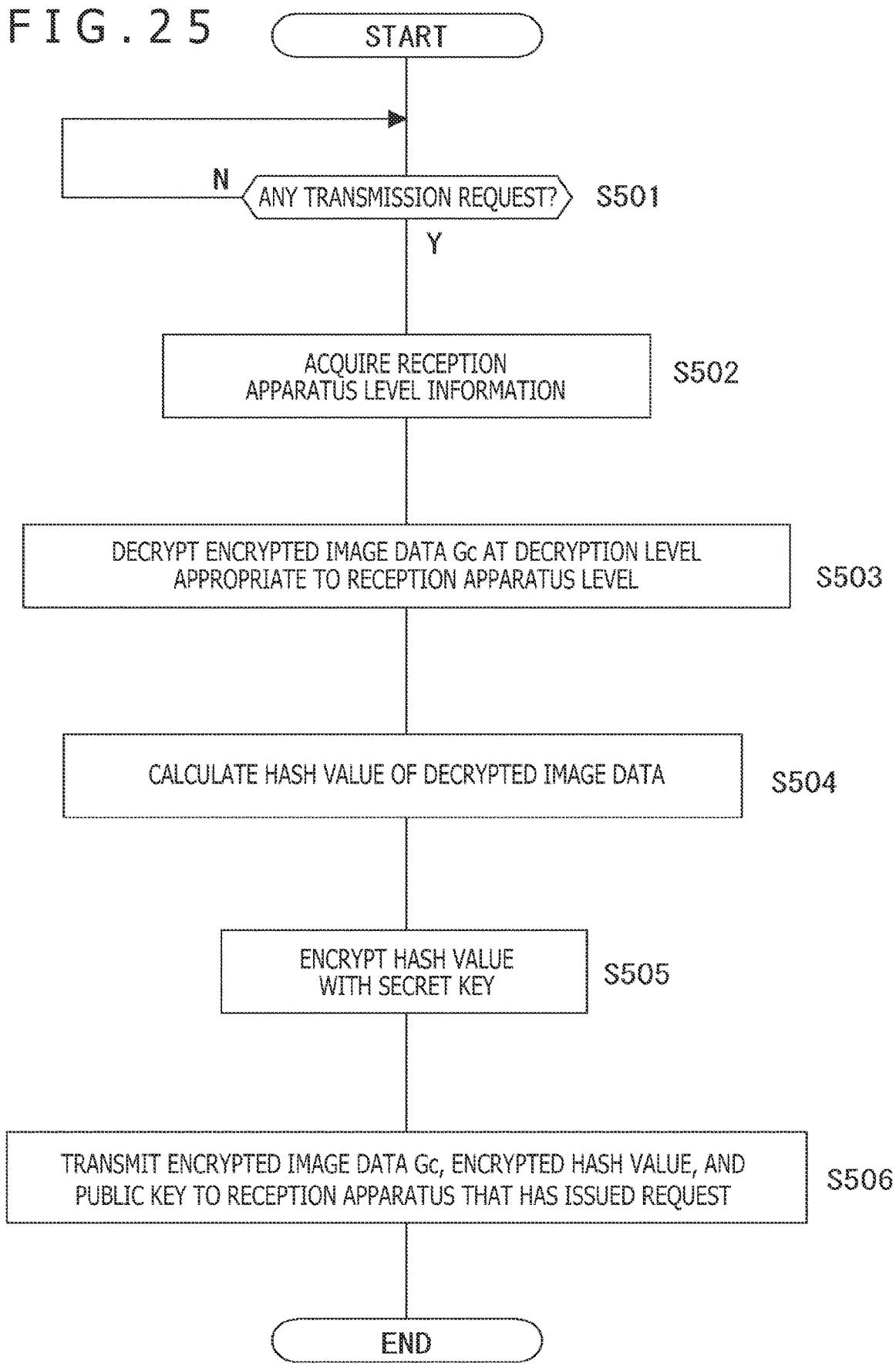
FIG. 25 is a flowchart illustrating an example of a processing procedure for realizing the tampering detection technique as the second embodiment.

It should be noted that, in the present example, the processing illustrated in FIG. 25 is performed by the control section 23.

First, the control section 23 waits for a transmission request from the side of the reception apparatus 3 in step S501. That is, the control section 23 waits for a request to transmit the encrypted image data Gc.

Next, in step S502 that follows, the control section 23 acquires level information of the reception apparatus 3. That is, the control section 23 acquires information indicating the level of the decipher key possessed by the reception apparatus 3 that has issued the transmission request. In the present example, the level information is transmitted to the imaging apparatus 1 from the reception apparatus 3, together with the transmission request.

In step S503 following step S502, the control section 23 decrypts the encrypted image data Gc at the decryption level appropriate to the level of the reception apparatus 3. That is, the control section 23 decrypts the encrypted image data Gc recorded in the memory section 24 with the decipher key appropriate to the level information acquired in step S402. Specifically, the encrypted image data Gc is decrypted with the decipher key appropriate to the level of the key possessed by the reception apparatus 3. For example, the data is decrypted with the first cipher key in the case of level 1, and the data is decrypted with a combined key of the first and second cipher keys in the case of level 2.

The control section 23 calculates a hash value of the decrypted image data in step S504 following step S503 and further encrypts the hash value with the secret key in step S505 that follows.

Further, in step S506 that follows, the control section 23 transmits the encrypted image data Gc, the encrypted hash value, and a public key to the reception apparatus 3 that has issued a request, and terminates the series of processing tasks illustrated in FIG. 25.

As a reminder for confirmation, the public key transmitted in step S506 is the public key generated as a signature verification key on the basis of the secret key as a signature generation key generated on the basis of a photoelectric random number.

Although an example in which the public key and the secret key as a pair are shared among all levels has been cited above, the public key and the secret key may differ depending on respective levels.

[2-4. Confirmation Process of Public Key Possessed by Receiver Side]

A description will be given here of an example of a confirmation process to confirm whether or not the public key possessed by the reception apparatus 3 is a proper public key, in the case where the technique is used that varies the image area that can be decrypted according to the level of the key on the side of the reception apparatus 3. It should be noted that the public key stated here is not a public key for electronic signature but a public key used to securely pass an image encryption key (encryption filter) as a common key to the side of the reception apparatus 3 (refer to the description regarding FIG. 11).

It should be noted that examples in which the levels of the key possessed by the reception apparatuses 3 are level 1 and level 2 are described below in FIGS. 26 to 30, and even if the level of the key possessed by the reception apparatus 3 is another level, it is only necessary to perform similar processing on the reception apparatus 3 of the other level.

Figure 26:
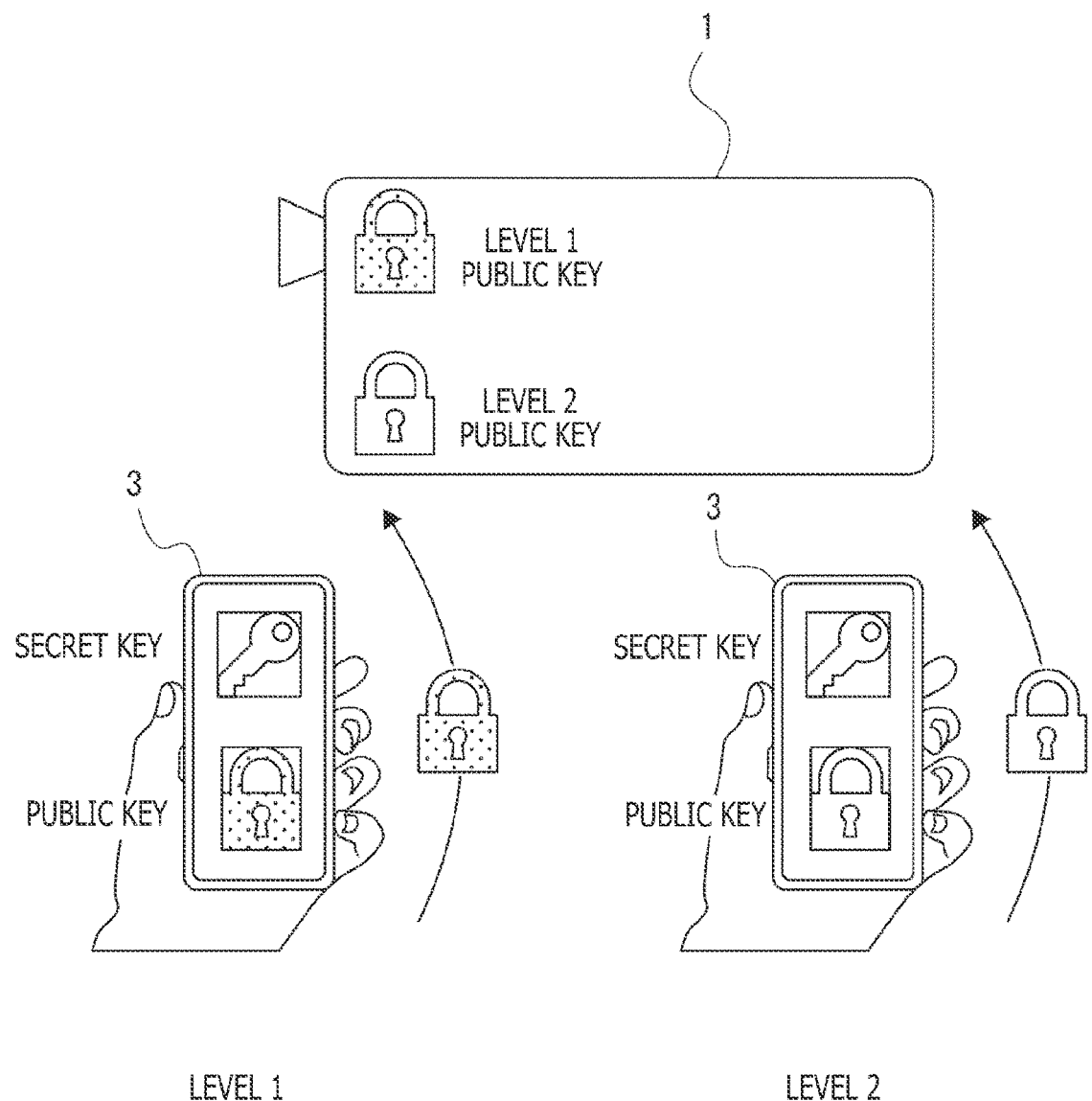
FIG. 26 is an explanatory diagram describing that the reception apparatus of each level causes the imaging apparatus to possess a public key of the reception apparatus itself.

First, as illustrated in FIG. 26, the reception apparatus 3 of each level possesses a secret key and a public key and transmits its public key to the imaging apparatus 1.

Figure 27:
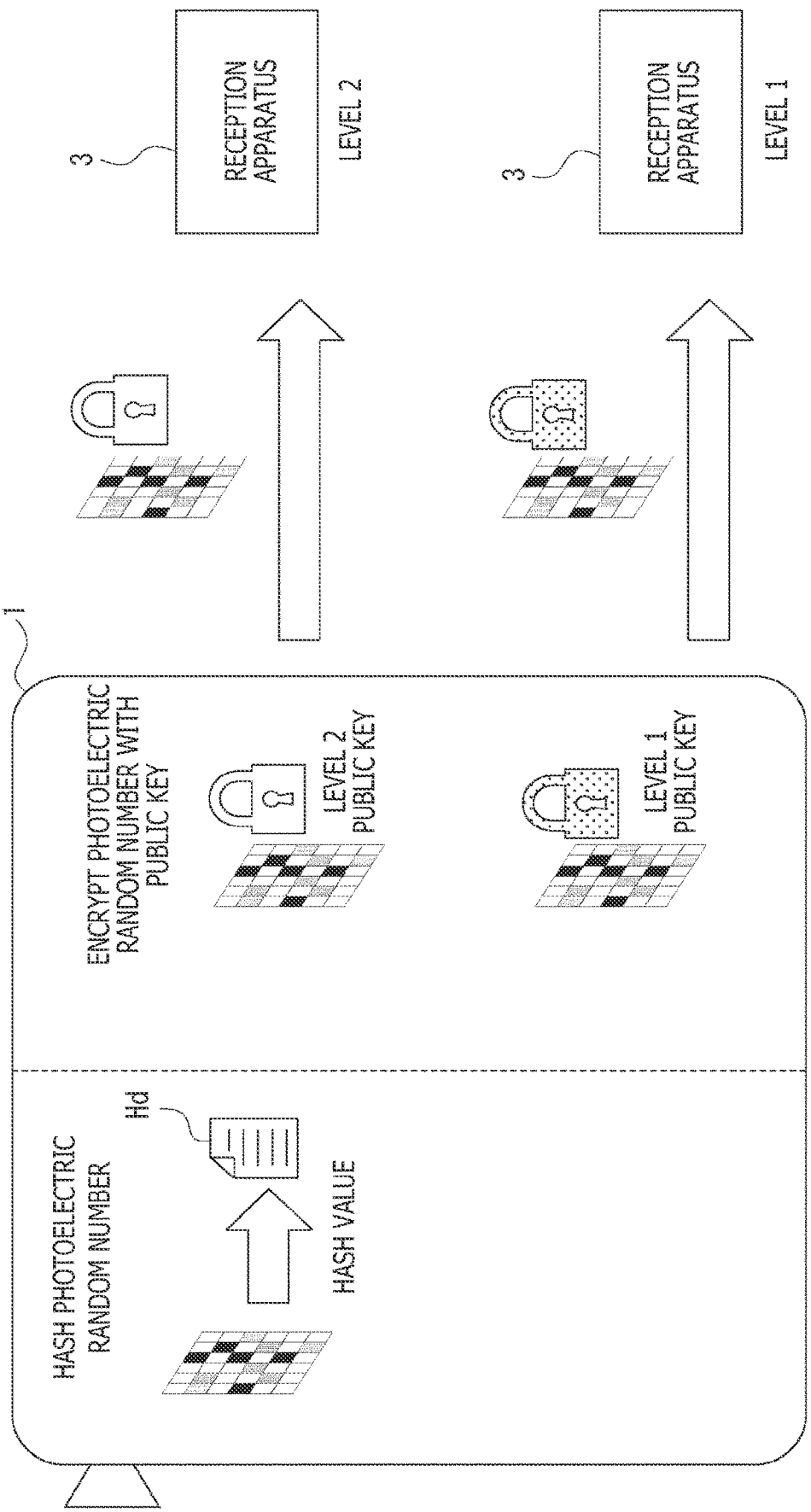
FIG. 27 is a diagram for describing an example of a confirmation process of the public key possessed by a receiver side.

Then, as illustrated in FIG. 27, the imaging apparatus 1 generates a hash value Hd acquired by hashing a photoelectric random number.

Thereafter, the imaging apparatus 1 encrypts the photoelectric random number with a public key of a corresponding level, for each level of the reception apparatus 3. Then, the imaging apparatus 1 transmits the photoelectric random number acquired from encryption with the public key of level 1 to the reception apparatus 3 of level 1 and the photoelectric random number acquired from encryption with the public key of level 2 to the reception apparatus 3 of level 2.

Figure 28:
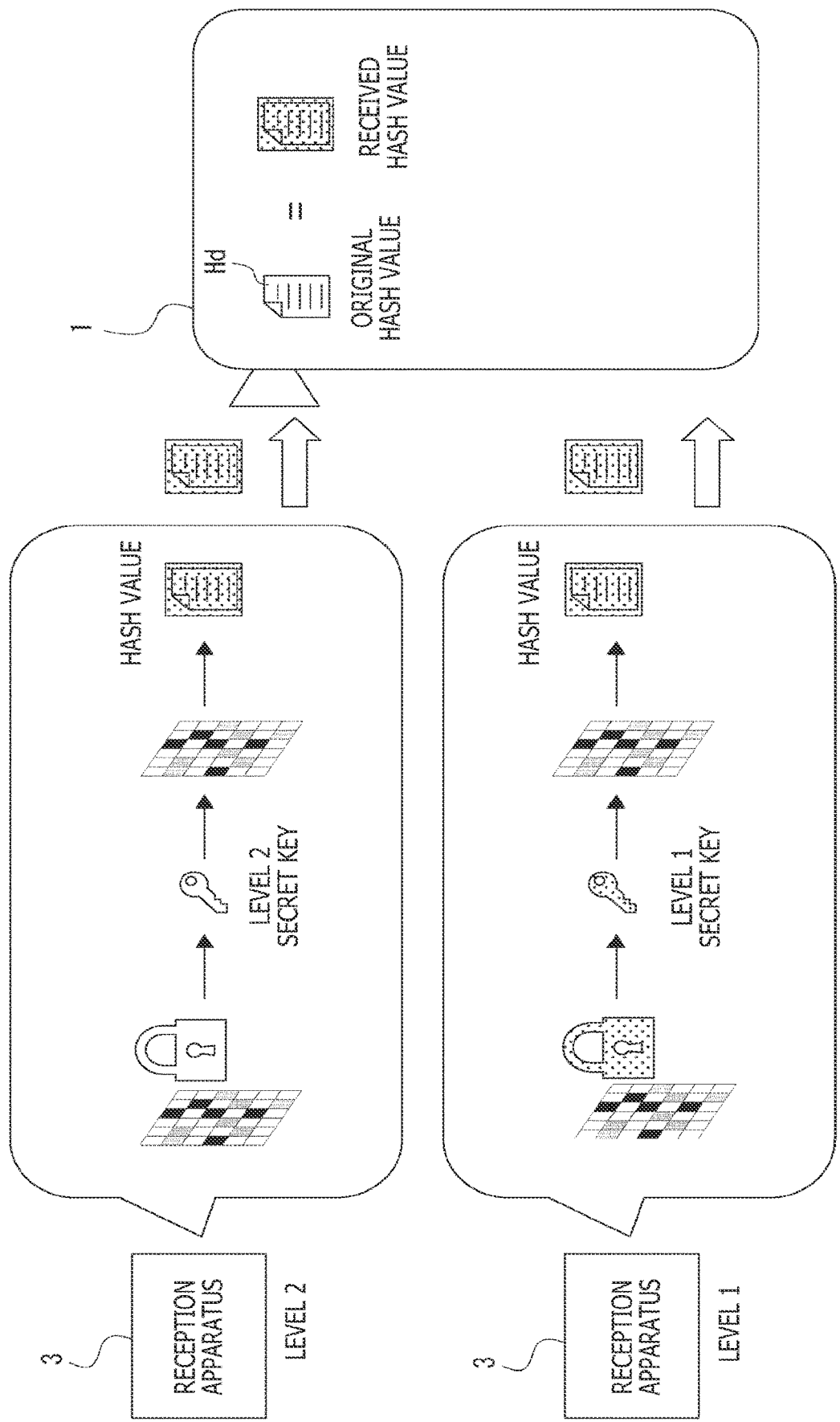
FIG. 28 is also a diagram for describing an example of a confirmation process of the public key possessed by the receiver side.

On the side of the reception apparatus 3 of each level, as illustrated in FIG. 28, the photoelectric random number encrypted with the public key is decrypted with the secret key of the level possessed by the reception apparatus 3 itself. Then, the reception apparatus 3 of each level calculates a hash value from the decrypted photoelectric random number and transmits the hash value to the imaging apparatus 1.

The imaging apparatus 1 determines whether or not the hash value received from the reception apparatus 3 of each level and the original hash value Hd calculated in FIG. 27 match.

In the case where the received hash value matches the hash value Hd, the imaging apparatus 1 registers the reception apparatus 3 that has transmitted the hash value as an authentic receiver.

[2-5. Confirmation Process of Electronic Signature Public Key Possessed by Transmitter Side]

A description will be given next of an example of a confirmation process to confirm whether or not an electronic signature public key possessed by the imaging apparatus 1 is a proper public key. Specifically, the confirmation process described here is a process for confirming, on the side of the reception apparatus 3 of each level, whether or not the electronic signature public key (public key as a signature verification key) possessed by the imaging apparatus 1 is a proper public key.

Figure 29:
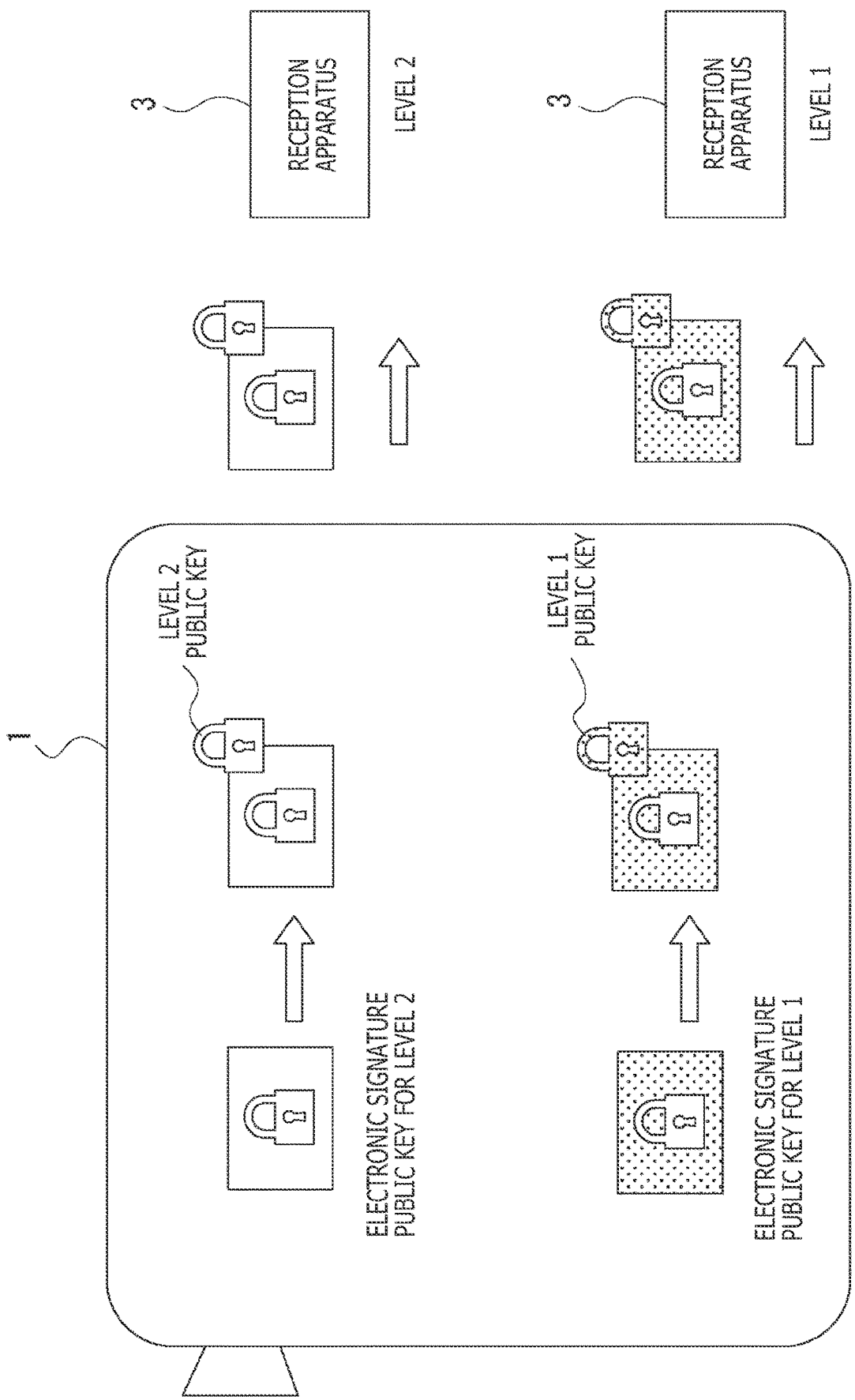
FIG. 29 is a diagram for describing an example of a confirmation process of an electronic signature public key possessed by a transmitter side.

First, as illustrated in FIG. 29, the imaging apparatus 1 encrypts an electronic signature public key for level 1 and an electronic signature public key for level 2 possessed by itself with the public keys of the respective levels. The public keys of the respective levels used for this encryption are the public keys possessed by the imaging apparatus 1 as a result of the transmission by the reception apparatuses 3 of the respective levels as described above with reference to FIG. 26.

The imaging apparatus 1 transmits the electronic signature public key for level 1 that has been encrypted with the public key of level 1 to the reception apparatus 3 of level 1 and the electronic signature public key for level 2 that has been encrypted with the public key of level 2 to the reception apparatus 3 of level 2.

Figure 30:
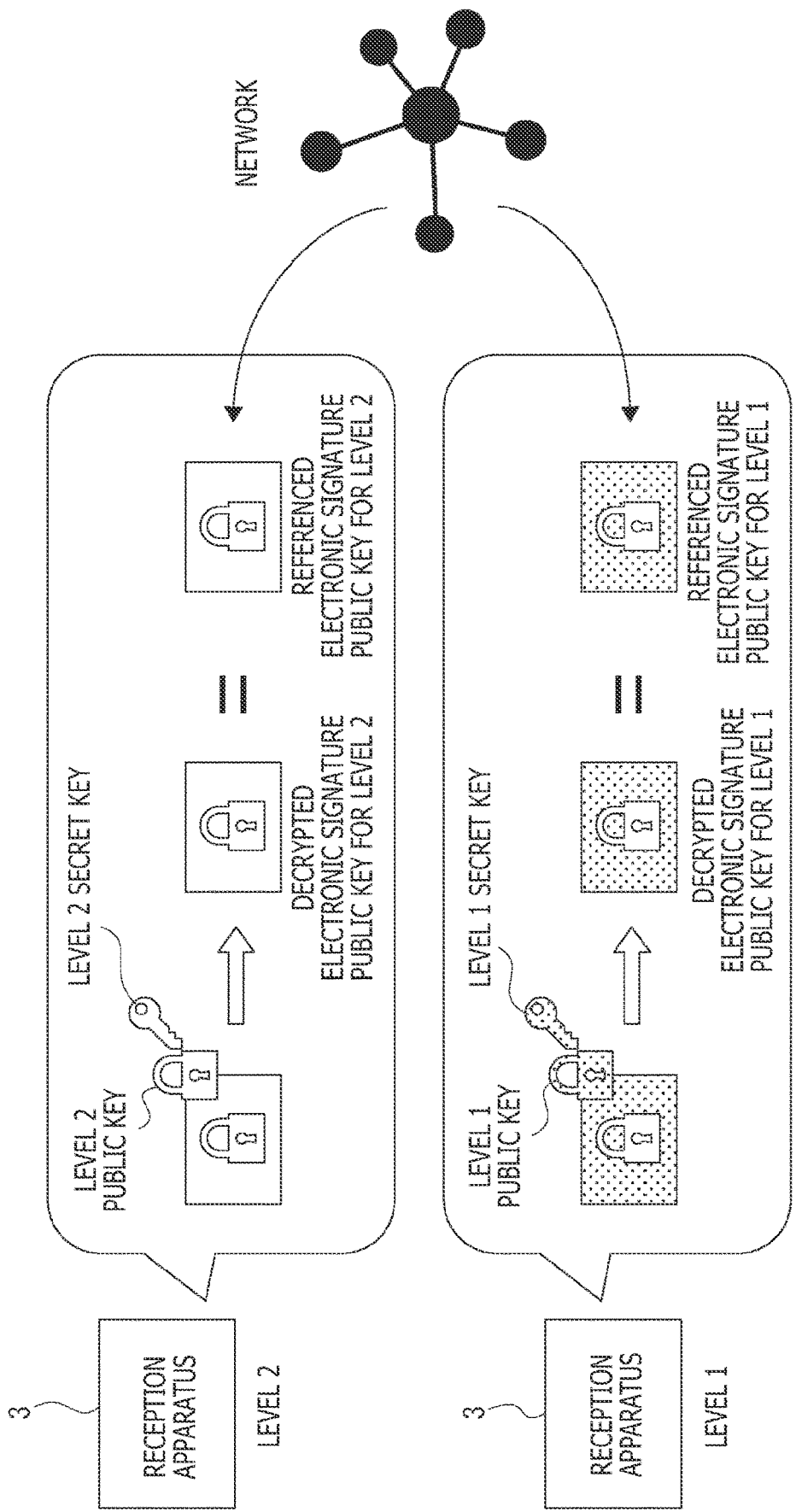
FIG. 30 is also a diagram for describing an example of a confirmation process of the electronic signature public key possessed by the transmitter side.

The reception apparatus 3 of each level decrypts, as illustrated in FIG. 30, the encrypted electronic signature public key received from the imaging apparatus 1 with the secret key of the level possessed by the reception apparatus 3 itself.

Meanwhile, the reception apparatus 3 of each level refers to the electronic signature public key managed in association with the imaging apparatus 1 from a predetermined server apparatus such as certification authority server on a network and determines whether or not the electronic signature public key that has been referred to and the electronic signature public key decrypted as described above match. In the case where the two public keys for electronic signature match, the reception apparatus 3 of each level registers the imaging apparatus 1 as a presumed and proper transmitter.

Here, information regarding the possessors of the public keys for electronic signature is managed on the network and can be confirmed. A system for this confirmation is not particularly limited, and a PGP (Pretty Good Privacy) scheme and a PKI (Public Key Infrastructure) scheme can be cited as examples.

3. Third Embodiment

A description of a third embodiment will be given next.

In the third embodiment, a secret key for electronic signature in a blockchain system is generated on the basis of a photoelectric random number.

Here, the blockchain means chronological connection of blocks including multiple pieces of transaction data. The blockchain system means a system that handles such a blockchain and mutually manages transaction data (transactions) in a distributed manner by using a P2P (Peer to Peer) network.

Figure 31:
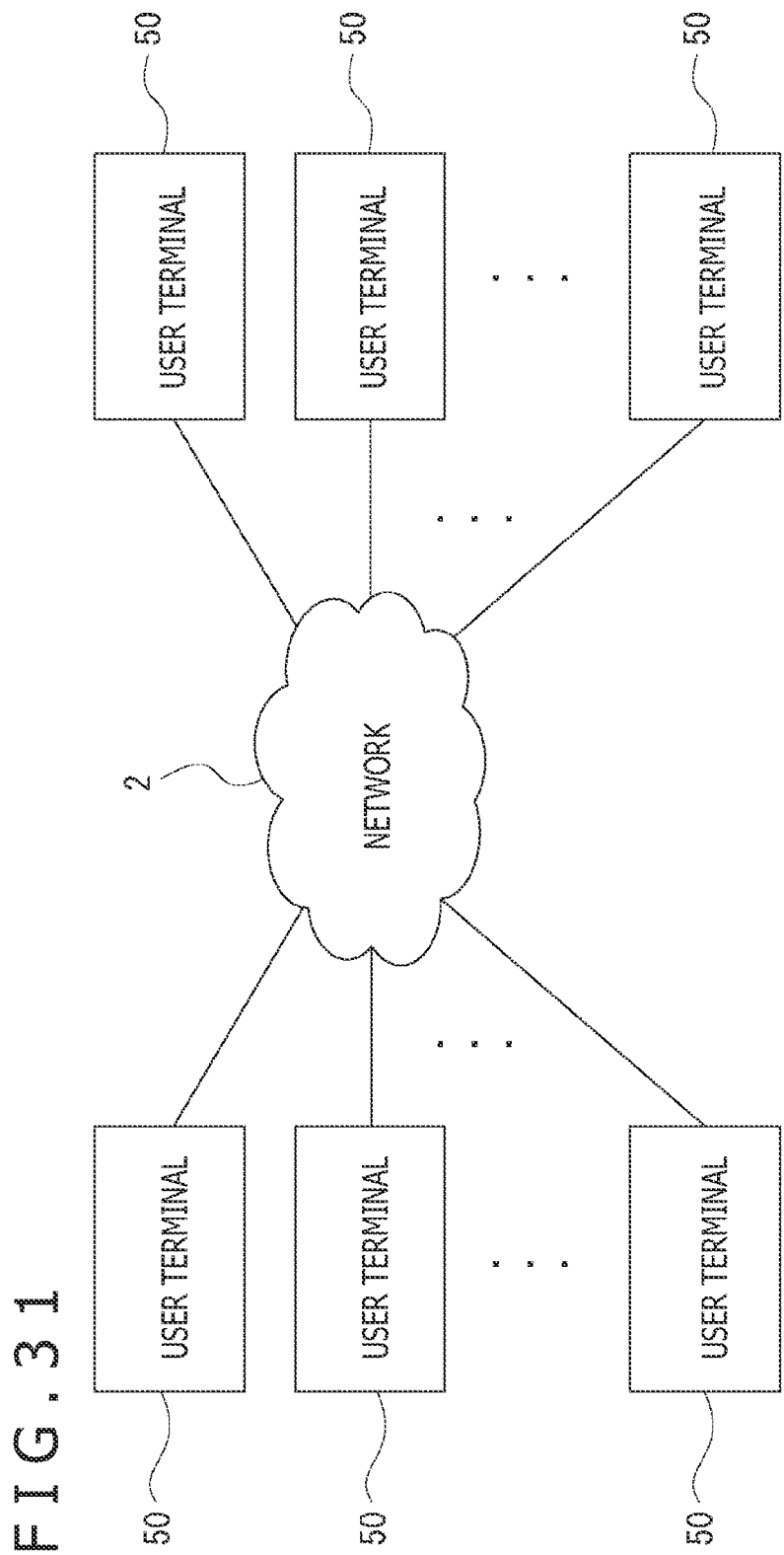
FIG. 31 is a block diagram illustrating a hardware configuration of a blockchain system.

FIG. 31 is a block diagram illustrating a hardware configuration of a blockchain system.

As illustrated, in the blockchain system, each of multiple user terminals 50 is connected, for example, to a network 2 as the Internet, and the respective user terminals 50 can communicate data with each other via the network 2.

Figure 32:
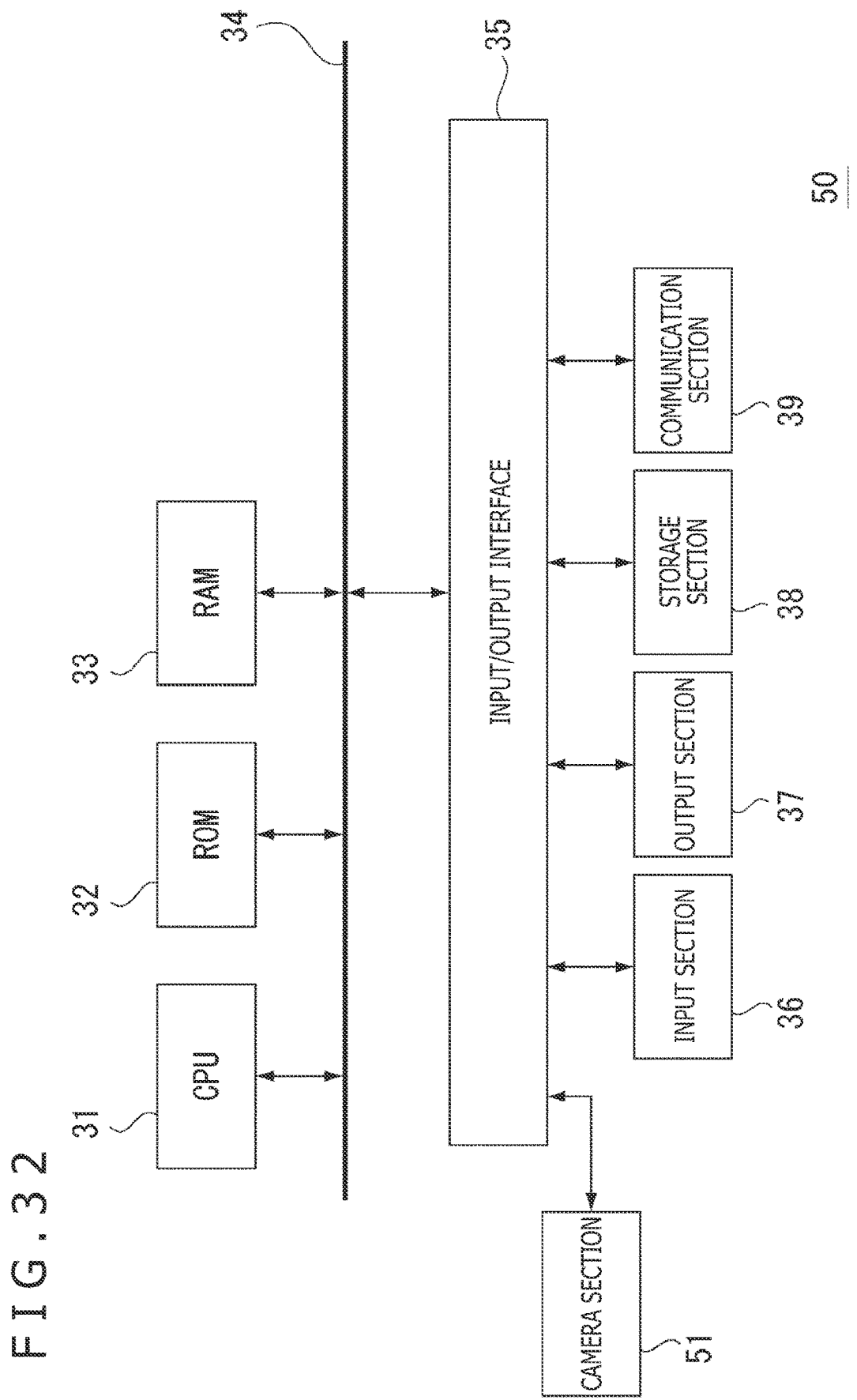
FIG. 32 is a block diagram illustrating an internal configuration example of a user terminal included in the blockchain system.

FIG. 32 is a block diagram illustrating an internal configuration example of the user terminal 50.

As illustrated, the user terminal 50 has a similar configuration to that of the reception apparatus 3 illustrated in FIG. 3, and further includes a camera section 51 connected to the input/output interface 35. The camera section 51 has at least the array sensor 12 illustrated in FIG. 2 and can generate image data as the seed frame described above.

In the blockchain system, the user terminal 50 connected to the network 2 generates a secret key for electronic signature.

In the blockchain system, a public key is generated from this secret key, and a blockchain address is generated on the basis of the public key. If likened to a bank account, the blockchain address is information equivalent to an account number, and cryptocurrency transactions in the blockchain system are performed by exchanging currency between blockchain addresses.

Also, a public key generated from a secret key in the blockchain system is used to detect tampering in transactions broadcast to the P2P network encrypted with the secret key. That is, the secret key and the public key in this case are used to check whether or not the transactions have been performed legitimately.

A random number is also used to generate a secret key in the blockchain system, and if prediction of the random number is easy, the secret key is easily deciphered, that is, fraudulent transactions are easily performed. Accordingly, the random number plays an important role in enhancing security of the blockchain system.

Accordingly, in the third embodiment, a secret key for electronic signature in the blockchain system is generated on the basis of a photoelectric random number.

Specifically, in order to generate a secret key for electronic signature, the CPU 31 of the user terminal 50 causes the camera section 51 to generate image data as a seed frame. Then, the CPU 31 acquires an electric signal value of each pixel of the image data as a photoelectric random number and generates a secret key on the basis of the photoelectric random number.

This makes it possible to render decipherment of the secret key for electronic signature in the blockchain system more difficult than that in the case where a pseudorandom number is used.

Here, a smart contract system (hereinafter denoted as an "SC system") is known as a mechanism for automatically carrying out a transaction contract on the basis of a blockchain system without human intervention.

The SC system is programmed in advance to automatically carry out details of the contract in the case where a specific condition is met, thus allowing a trustless transaction. It should be noted that the trustless transaction refers to a digital transaction carried out between related parties without need for third party intervention.

In the SC system, when a contract verification operator is selected on the blockchain system, a random number is used to fairly perform such a selection. However, if it is easy to predict this random number, it is possible to intentionally select a verification operator, possibly resulting in loss of fairness in the selection of a verification operator.

Accordingly, in the present embodiment, the selection of a contract verification operator in the SC system is performed on the basis of a photoelectric random number.

Figure 33:
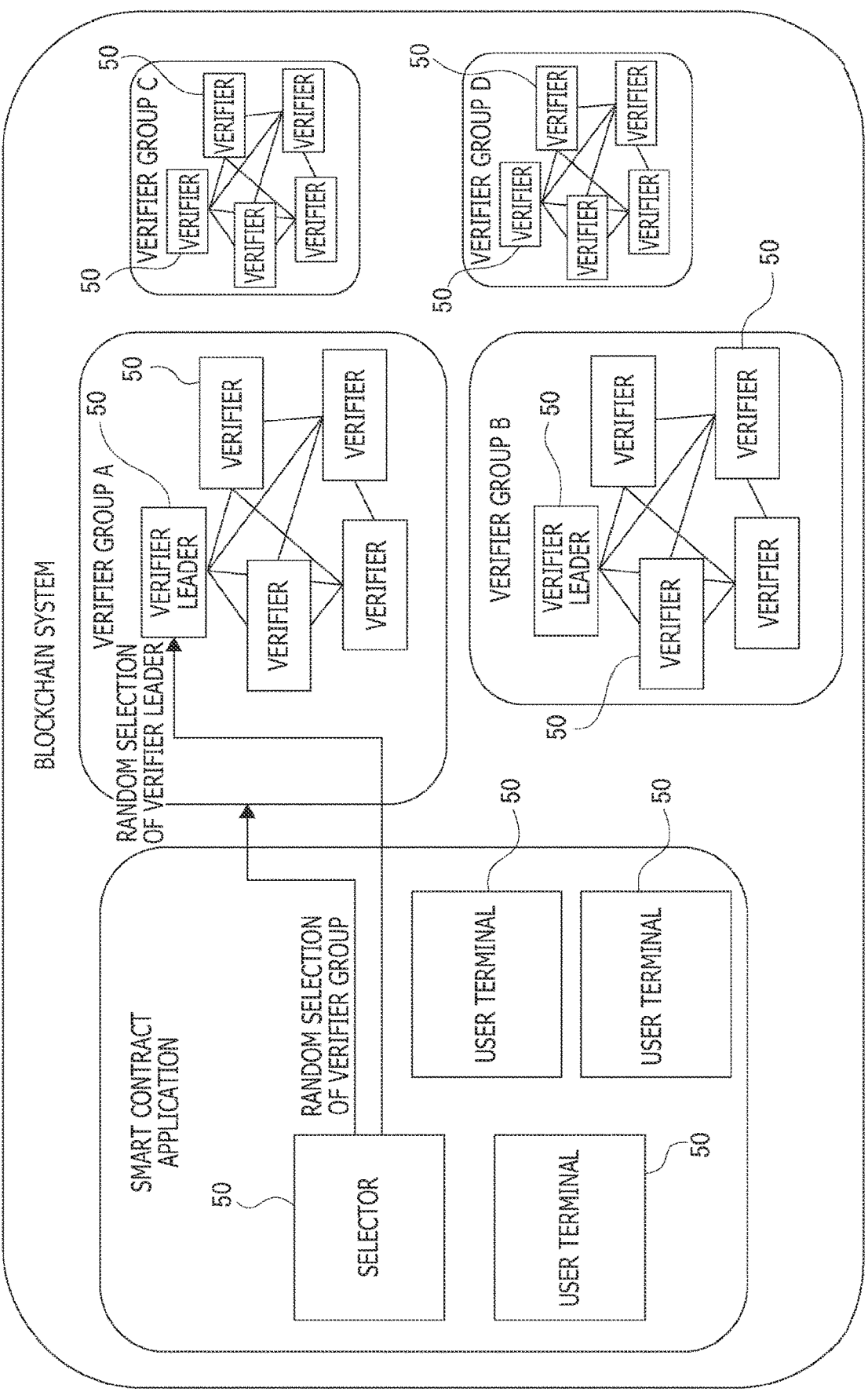
FIG. 33 is a diagram conceptually illustrating a configuration of a smart contract system.

FIG. 33 is a diagram conceptually illustrating a configuration of the SC system.

In the SC system, there are various user terminals 50 on the blockchain system. A smart contract application in FIG. 33 represents the set of user terminals 50 that receive smart contract services and manage the operation of smart contracts. Also, verifier groups in FIG. 33 represent the sets of user terminals 50 as contract verification operators.

As illustrated in FIG. 33, the smart contract verification operators are divided into multiple groups (verifier groups), and there are cases where the verifier operators synchronize data with each other within each group.

In such a case, the selection of a predetermined number of verifier groups from among the multiple verifier groups can take place. In such a case, the user terminal 50 as a selector in the smart contract application selects the verifier groups on the basis of a photoelectric random number.

Also, there are cases where a verification operator leader (verifier leader in FIG. 33) is selected within a group. In that case, the user terminal 50 as the selector selects the leader on the basis of a photoelectric random number.

It should be noted that the selection of a verifier group as described above can be, in other words, said to be the selection of multiple verification operators.

The CPU 31 causes the camera section 51 to generate image data as a seed frame and acquires an electric signal value of each pixel of the image data as a photoelectric random number, and on the basis of the acquired photoelectric random number, the selection of verifier groups and leaders as described above is performed in the user terminal 50 as the selector.

Also, as another example of the third embodiment, it is also possible to use a photoelectric random number to select a representative in DApps (Decentralized Applications).

Here, DApps are applications using the blockchain technology.

A number of applications, and mainly game applications, have been developed as DApps. For example, presumed applications as DApps are those that use a required cryptocurrency system as a base and are configured to randomly provide service recipients with a reward. At this time, an RNG (Random Number Generator) is used in DApps to select a representative who can gain a reward.

However, in the case where the random number generated by the RNG is predictable, a specific service recipient can fraudulently gain a reward, thus resulting in lack of fairness in services.

Accordingly, it is conceivable that fairness is enhanced by using a photoelectric random number in the selection of a representative from among DApps service recipients.

In this case, in the user terminal 50 that selects the representative described above in a blockchain system, the CPU 31 causes the camera section 51 to generate image data as a seed frame, acquires an electric signal value of each pixel of the image data as a photoelectric random number, and selects the representative described above on the basis of the photoelectric random number.

It should be noted that a photoelectric random number acquired by shuffling the pixel positions as described in FIG. 4 can also be used as a photoelectric random number in the third embodiment.

In addition, in the third embodiment, it is also possible to delete, from the memory, image data from which the photoelectric random number is derived, and regenerate a photoelectric random number in response to detection of unauthorized access from external equipment. In the third embodiment, for example, the CPU 31 issues an instruction to perform the deletion described above or to regenerate a photoelectric random number.

4. Modification Example

It should be noted that embodiments are not limited to the specific examples described so far and that various modification examples are conceivable.

For example, while cases where image data is used as data to be subjected to electronic signature have been illustrated in the first and second embodiments, the present technology is widely and suitably applicable to tampering detection of various types of data such as text data and audio data using electronic signature.

Also, while an example in which a secret key based on a photoelectric random number is generated by equipment external to the imaging sensor section 10 has been cited above, it is also possible to generate a secret key based on a photoelectric random number inside the imaging sensor section 10 (e.g., generate a secret key by using the computation section 18).

Also, as for encryption based on a photoelectric random number, the following techniques can also be adopted as modification examples.

One technique uses dark current noise and reading noise which are types of noise reduced in ordinary image sensors, to generate high randomness. Specifically, it is possible to cite a technique that increases dark current noise caused by thermal noise, by increasing the amplification factor of the amplifier while reducing exposure time (accumulation time) during capturing of a seed frame for random numbers. Alternatively, it is also possible to cite a technique that uses, as a seed frame, a captured image acquired by performing reading with a circuit for reducing reading noise (e.g., noise reducing circuit such as adaptive gain amplifier) turned off.

Also, in another conceivable technique, in the case where an image sensor having regularly arranged color filters (wavelength filters), such as one having a Bayer pattern, is used, the pixels with only filters of any one color (filters of one wavelength band) are referred to as a seed frame for generating a random number. For example, in the case of the Bayer pattern, only the red pixels are referred to.

By adopting these techniques, it is possible to generate a random number which is more random.

Also, although, as for encryption of data to be subjected to electronic signature, an example in which encryption based on a photoelectric random number is performed has been cited above, a random number used for encryption of the data is not limited to a photoelectric random number. For example, it is also possible to use a pseudorandom number. Alternatively, if a true random number is used, a possible technique is to detect a natural phenomenon that is substantially impossible to predict and reproduce, such as change in heat or sound, with a sensor capable of such detection and generate a random number on the basis of that value.

Also, it is not mandatory to encrypt data to be subjected to electronic signature.

5. Conclusion of Embodiments

As described above, the cipher key generation apparatus of the embodiments (the imaging apparatus 1 or the user terminal 50) includes a key generation section (control section 23 or CPU 31: refer to step ST2) that generates a secret key for electronic signature on the basis of a photoelectric random number as a random number acquired on the basis of photoelectric conversion in an array sensor (array sensor 12) in which multiple pixels each having a visible or invisible light reception element are arranged one-dimensionally or two-dimensionally.

This makes it possible to render decipherment of a secret key for electronic signature more difficult than that in the case where a pseudorandom number is used.

Accordingly, it is possible to enhance tampering detection performance.

Also, in the cipher key generation apparatus of the embodiments, the key generation section generates a secret key for electronic signature for image data.

This makes it possible to render decipherment of a secret key for electronic signature more difficult than that in the case where a pseudorandom number is used, to deal with the case where data to be subjected to electronic signature is image data.

Accordingly, it is possible to enhance tampering detection performance for image data.

Further, in the cipher key generation apparatus of the embodiments, the key generation section generates a secret key for electronic signature for image data acquired through imaging by the array sensor.

As a result, an array sensor for acquiring image data is also used as an array sensor for acquiring a photoelectric random number.

Accordingly, it is no longer necessary to provide an array sensor for generating a photoelectric random number separately from an array sensor for generating image data, thus contributing to a reduced number of components and reduced cost.

Still further, the cipher key generation apparatus of the embodiments includes an encryption section (amplitude control circuit 19 or 19A and computation section 18) and a transmission processing section (control section 23: refer to steps S204 and S506). The encryption section encrypts the image data acquired through imaging by the array sensor. The transmission processing section performs processing of transmitting the image data encrypted by the encryption section to an external apparatus.

This makes it possible to securely transmit image data as data to be subjected to electronic signature.

Accordingly, it is possible to enhance security for preventing leakage of image contents.

Also, in the cipher key generation apparatus of the embodiments, the encryption section encrypts the image data with a cipher key generated on the basis of the photoelectric random number.

This makes it possible, also for image data encryption, to render decipherment of a cipher key more difficult than that in the case where a pseudorandom number is used.

Accordingly, it is possible to further enhance security.

Further, in the cipher key generation apparatus of the embodiments, the encryption section encrypts the image data in such a manner that an image area capable of being decrypted varies depending on a level of a decipher key used to decrypt the image data, and in response to a request from the external apparatus to transmit the image data encrypted by the encryption section, the transmission processing section decrypts the encrypted image data with a decipher key having the same level as the decipher key possessed by the external apparatus, generates a hash value of the decrypted image data, and transmits the hash value encrypted with the secret key and the encrypted image data to the external apparatus (refer to FIGS. 23 and 25).

As a result, in the case where a hash value that is appropriate to the level of a decipher key possessed by a reception apparatus of image data should be transmitted to the reception apparatus, it is only necessary to generate a hash value when a transmission request is issued and on the basis of the level of the decipher key of the reception apparatus that has issued the transmission request, and it is no longer necessary to generate all hash values of the respective levels at once during recording of image data (captured image data).

Accordingly, it is possible to keep delayed processing associated with hash value generation to a minimum.

Still further, in the cipher key generation apparatus of the embodiments, the key generation section (CPU 31) generates a secret key for electronic signature in a blockchain system on the basis of the photoelectric random number.

This makes it possible to render decipherment of a secret key for electronic signature in a blockchain system more difficult than that in the case where a pseudorandom number is used.

Accordingly, it is possible to enhance tampering detection performance for image data to be subjected to electronic signature in the blockchain system.

Also, the cipher key generation apparatus of the embodiments includes a verification operator selection section (CPU 31: refer to FIG. 33) that selects a contract verification operator in a smart contract system on the basis of the photoelectric random number.

This makes it possible to render decipherment of a random number used to select a contract verification operator more difficult than the case where a pseudorandom number is used.

Accordingly, it is possible to enhance fairness in the selection of a contract verification operator.

Further, the cipher key generation apparatus of the embodiments includes a representative selection section (CPU 31) that selects a representative from among DApps service recipients on the basis of the photoelectric random number.

This makes it possible to render decipherment of a random number used to select a representative from among DApps service recipients more difficult than the case where a pseudorandom number is used.

Accordingly, it is possible to enhance fairness in the selection of a representative from among DApps service recipients.

Still further, in the cipher key generation apparatus of the embodiments, the key generation section generates the secret key by acquiring, as the photoelectric random number, an electric signal value of each of the pixels that is acquired by the photoelectric conversion.

This makes it possible to generate a secret key for electronic signature that is difficult to decipher.

Accordingly, it is possible to enhance tampering detection performance.

Also, in the cipher key generation apparatus of the embodiments, the key generation section generates the secret key on the basis of the photoelectric random number in a format in which at least some of electric signal values of the respective pixels are assigned to pixel positions different from pixel positions from which the electric signal values have been acquired.

This renders decipherment of a secret key for electronic signature more difficult than that in the case of using a photoelectric random number in a format in which the electric signal values of the respective pixels are assigned as is to the pixel positions from which these electric signal values have been acquired.

Accordingly, it is possible to enhance tampering detection performance.

Further, the cipher key generation apparatus of the embodiments includes a deletion processing section (computation section 18, control section 23, or CPU 31: refer to steps S106, ST1, or the like) that performs processing of deleting, after generation of the photoelectric random number, image data from which the photoelectric random number is derived, from a memory.

This makes it possible to prevent estimation of the photoelectric random number due to leakage of the image from which the photoelectric random number is derived.

Accordingly, it is possible to enhance tampering detection performance.

Still further, the cipher key generation apparatus of the embodiments includes a regeneration processing section (computation section 18, control section 23, or CPU 31: refer to step ST1 in FIG. 10, or the like) that performs processing of regenerating the photoelectric random number in response to detection of unauthorized access from equipment external to the cipher key generation apparatus.

This makes it possible to update a secret key for electronic signature on the basis of the regenerated photoelectric random number in the case where unauthorized access from external equipment is detected.

Accordingly, even in the event of leakage of a secret key to external equipment due to the unauthorized access, it is possible to prevent tampering detection processing from being performed properly with the secret key that has leaked, thus enhancing effectiveness in keeping data tampering to a minimum.

In addition, a cipher key generation method of the embodiments is performed by an information processing apparatus. The cipher key generation method includes generating a secret key for electronic signature on the basis of a photoelectric random number as a random number acquired on the basis of photoelectric conversion in an array sensor in which multiple pixels each having a visible or invisible light reception element are arranged one-dimensionally or two-dimensionally.

Such a cipher key generation method also provides a similar advantageous effect to that of the cipher key generation apparatus of the embodiments described above.

It should be noted that the advantageous effects described in the present specification are illustrative and not restrictive, and there may be other advantageous effects.

6. Present Technology

The present technology can also have the following configurations.

(1)

A cipher key generation apparatus including:

a key generation section adapted to generate a secret key for electronic signature on the basis of a photoelectric random number as a random number acquired on the basis of photoelectric conversion in an array sensor in which multiple pixels each having a visible or invisible light reception element are arranged one-dimensionally or two-dimensionally.

(2)

The cipher key generation apparatus of feature (1), in which the key generation section generates a secret key for electronic signature for image data.

(3)

The cipher key generation apparatus of feature (2), in which the key generation section generates a secret key for electronic signature for image data acquired through imaging by the array sensor.

(4)

The cipher key generation apparatus of feature (3), further including:

an encryption section adapted to encrypt the image data acquired through imaging by the array sensor; and a transmission processing section adapted to perform processing of transmitting the image data encrypted by the encryption section to an external apparatus.

(5)

The cipher key generation apparatus of feature (4), in which the encryption section encrypts the image data with a cipher key generated on the basis of the photoelectric random number.

(6)

The cipher key generation apparatus of feature (4) or (5), in which the encryption section encrypts the image data in such a manner that an image area capable of being decrypted varies depending on a level of a decipher key used to decrypt the image data, and in response to a request from the external apparatus to transmit the image data encrypted by the encryption section, the transmission processing section decrypts the encrypted image data with a decipher key having the same level as the decipher key possessed by the external apparatus, generates a hash value of the decrypted image data, and transmits the hash value encrypted with the secret key and the encrypted image data to the external apparatus.

(7)

The cipher key generation apparatus of feature (1), in which the key generation section generates a secret key for electronic signature in a blockchain system on the basis of the photoelectric random number.

(8)

The cipher key generation apparatus of feature (7), further including:

a verification operator selection section adapted to select a contract verification operator in a smart contract system on the basis of the photoelectric random number.

(9)

The cipher key generation apparatus of feature (7) or (8), further including:

a representative selection section adapted to select a representative from among DApps service recipients on the basis of the photoelectric random number.

(10)

The cipher key generation apparatus of any one of features (1) to (9), in which the key generation section generates the secret key by acquiring, as the photoelectric random number, an electric signal value of each of the pixels that is acquired by the photoelectric conversion.

(11)

The cipher key generation apparatus of feature (10), in which the key generation section generates the secret key on the basis of the photoelectric random number in a format in which at least some of electric signal values of the respective pixels are assigned to pixel positions different from pixel positions from which the electric signal values have been acquired.

(12)

The cipher key generation apparatus of any one of features (1) to (11), further including:

a deletion processing section adapted to perform processing of deleting, after generation of the photoelectric random number, image data from which the photoelectric random number is derived, from a memory.

(13)

The cipher key generation apparatus of any one of features (1) to (12), further including:

a regeneration processing section adapted to perform processing of regenerating the photoelectric random number in response to detection of unauthorized access from equipment external to the cipher key generation apparatus.

REFERENCE SIGNS LIST

1: Imaging apparatus
2: Network
3: Reception apparatus
10: Imaging sensor section
12: Array sensor
13: ADC/pixel selector
14: Buffer
15: Logic section
16: Memory
17: Interface section
18: Computation section
19, 19A: Amplitude control circuit
81: Key frame selection section
82: Object region recognition section
83: Class identification section
84: Parameter selection section
85: Encryption control section 86: Unauthorized access detection section
21: Image processor
22: Sensor section
23: Control section
24: Memory section
25: Communication section
31: CPU
32: ROM
33: RAM
34: Bus
35: Input/output interface
36: Input section
37: Output section
38: Storage section
39: Communication section
40: Bounding box
41: ROI

The invention claimed is:

1. A cipher key generation apparatus comprising:
a memory that stores a program, and
a processor configured to execute the program to perform operations comprising:
generating a secret key for electronic signature on a basis of a photoelectric random number as a random number acquired on a basis of photoelectric conversion in an array sensor in which multiple pixels each having a visible or invisible light reception element are arranged one-dimensionally or two-dimensionally, wherein the secret key for electronic signature is applied to image data;
encrypting the image data in such a manner that an image area capable of being decrypted varies depending on a level of a decipher key used to decrypt the image data; and
in response to a request from an external apparatus to transmit the encrypted image data, decrypting the encrypted image data with a decipher key having a same level as the decipher key possessed by the external apparatus, generating a hash value of the decrypted image data, and transmitting the hash value encrypted with the secret key and the encrypted image data to the external apparatus.

2. The cipher key generation apparatus of claim 1, wherein the image data is acquired through imaging by the array sensor.

3. The cipher key generation apparatus of claim 2, wherein the operations further comprise:
encrypting the image data acquired through imaging by the array sensor; and
transmitting the encrypted image data to the external apparatus.

4. The cipher key generation apparatus of claim 3, wherein encrypting the image data includes encrypting the image data with a cipher key generated on the basis of the photoelectric random number.

5. The cipher key generation apparatus of claim 1, wherein the secret key is generated by acquiring, as the photoelectric random number, an electric signal value of each of the pixels that is acquired by the photoelectric conversion.

6. The cipher key generation apparatus of claim 5, wherein the secret key is generated on the basis of the photoelectric random number in a format in which at least some of electric signal values of respective pixels are assigned to pixel positions different from pixel positions from which the electric signal values have been acquired.

7. The cipher key generation apparatus of claim 1, wherein the operations further comprise:
deleting, after generation of the photoelectric random number, image data from which the photoelectric random number is derived, from a memory.

8. The cipher key generation apparatus of claim 1, wherein the operations further comprise:
regenerating the photoelectric random number in response to detection of unauthorized access from equipment external to the cipher key generation apparatus.

9. A cipher key generation apparatus comprising:
a memory that stores a program, and
a processor configured to execute the program to perform operations comprising:
generating a secret key for electronic signature on a basis of a photoelectric random number as a random number acquired on a basis of photoelectric conversion in an array sensor in which multiple pixels each having a visible or invisible light reception element are arranged one-dimensionally or two-dimensionally, wherein the secret key for electronic signature is configured for a blockchain system; and
selecting a representative from among decentralized application service recipients on the basis of the photoelectric random number.

10. The cipher key generation apparatus of claim 9, wherein the operations further comprise:
selecting a contract verification operator in a smart contract system on the basis of the photoelectric random number.

11. A cipher key generation method comprising:
by an information processing apparatus,
generating a secret key for electronic signature on a basis of a photoelectric random number as a random number acquired on a basis of photoelectric conversion in an array sensor in which multiple pixels each having a visible or invisible light reception element are arranged one-dimensionally or two-dimensionally, wherein the secret key for electronic signature is applied to image data;
encrypting the image data in such a manner that an image area capable of being decrypted varies depending on a level of a decipher key used to decrypt the image data; and
in response to a request from an external apparatus to transmit the encrypted image data, decrypting the encrypted image data with a decipher key having a same level as the decipher key possessed by the external apparatus, generating a hash value of the decrypted image data, and transmitting the hash value encrypted with the secret key and the encrypted image data to the external apparatus.

12. A non-transitory computer readable medium storing program code for cipher key generation, the program code being executable by a processor to perform operations comprising:
generating a secret key for electronic signature on a basis of a photoelectric random number as a random number acquired on a basis of photoelectric conversion in an array sensor in which multiple pixels each having a visible or invisible light reception element are arranged one-dimensionally or two-dimensionally, wherein the secret key for electronic signature is applied to image data;

encrypting the image data in such a manner that an image area capable of being decrypted varies depending on a level of a decipher key used to decrypt the image data; and in response to a request from an external apparatus to transmit the encrypted image data, decrypting the encrypted image data with a decipher key having a same level as the decipher key possessed by the external apparatus, generating a hash value of the decrypted image data, and transmitting the hash value encrypted with the secret key and the encrypted image data to the external apparatus.

13. A non-transitory computer readable medium storing program code for cipher key generation, the program code being executable by a processor to perform operations comprising:

generating a secret key for electronic signature on a basis of a photoelectric random number as a random number acquired on a basis of photoelectric conversion in an array sensor in which multiple pixels each having a visible or invisible light reception element are arranged one-dimensionally or two-dimensionally, wherein the secret key for electronic signature is configured for a blockchain system; and selecting a representative from among decentralized application service recipients on the basis of the photoelectric random number.

* * * * *